US009781392B2

United States Patent
Sahay et al.

(10) Patent No.: US 9,781,392 B2
(45) Date of Patent: Oct. 3, 2017

(54) FACILITATING PERSONAL ASSISTANCE FOR CURATION OF MULTIMEDIA AND GENERATION OF STORIES AT COMPUTING DEVICES

(71) Applicant: INTEL CORPORATION, Santa Clara, CA (US)

(72) Inventors: Saurav Sahay, Santa Clara, CA (US); Lama Nachman, Santa Clara, CA (US); Rita H. Wouhaybi, Portland, OR (US); Omar U. Florez, Sunnyvale, CA (US); Giuseppe Raffa, Portland, OR (US); Rahul C. Shah, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 42 days.

(21) Appl. No.: 14/855,910

(22) Filed: Sep. 16, 2015

(65) Prior Publication Data

US 2017/0078621 A1    Mar. 16, 2017

(51) Int. Cl.
*G06K 9/00* (2006.01)
*H04N 7/18* (2006.01)
(Continued)

(52) U.S. Cl.
CPC .............. *H04N 7/185* (2013.01); *G01S 19/13* (2013.01); *G06F 3/011* (2013.01); *G06F 3/167* (2013.01);
(Continued)

(58) Field of Classification Search
CPC ......... G06F 17/30247; G06F 17/30598; G06F 17/30056; G06F 2203/011
(Continued)

(56) References Cited

U.S. PATENT DOCUMENTS 6,629,104 B1 * 9/2003 Parulski ............ G06F 17/30265
                                                         348/231.2
6,931,147 B2 * 8/2005 Colmenarez ...... G06F 17/30265
                                                         382/118

(Continued)

FOREIGN PATENT DOCUMENTS

WO    2014078449    5/2014

OTHER PUBLICATIONS

Notification of Transmittal of the International Search Report and the Written Opinion of the International Searching Authority issued for International Patent Application No. PCT/US2016/043588, mailed Nov. 2, 2016.

*Primary Examiner* — John Strege
(74) *Attorney, Agent, or Firm* — Blakely, Sokoloff, Taylor & Zafman LLP

(57) ABSTRACT

A mechanism is described for facilitating personal assistance for curation of multimedia and generation of stories at computing devices according to one embodiment. A method of embodiments, as described herein, includes receiving, by one or more capturing/sensing components at a computing device, one or more media items relating to an event, and capturing a theme from the one or more media items, where the theme is captured based on at least one of activities, textual content, and scenes associated with the event. The method may further include forming a plurality of story elements to generate a story relating to the event, where the plurality of story elements are formed based on at least one of one or more characters, the theme associated with the event, and one or more emotions associated with the one or more characters, wherein the story is presented, via one or more display devices, to one or more users having access to the one or more display devices.

18 Claims, 8 Drawing Sheets

(51) Int. Cl.

| | |
|---|---|
| *H04N 5/232* | (2006.01) |
| *G06F 3/01* | (2006.01) |
| *G06F 3/16* | (2006.01) |
| *G06F 17/30* | (2006.01) |
| *G01S 19/13* | (2010.01) |
| *H04L 29/06* | (2006.01) |
| *G06F 17/22* | (2006.01) |
| *G06F 17/24* | (2006.01) |
| *G06F 17/27* | (2006.01) |
| *H04N 21/442* | (2011.01) |
| *H04N 21/854* | (2011.01) |
| *H04N 5/77* | (2006.01) |

(52) U.S. Cl.
CPC ........ *G06F 17/2229* (2013.01); *G06F 17/248* (2013.01); *G06F 17/278* (2013.01); *G06F 17/2785* (2013.01); *G06F 17/3028* (2013.01); *G06F 17/30056* (2013.01); *G06F 17/30247* (2013.01); *G06F 17/30598* (2013.01); *H04L 65/403* (2013.01); *H04N 5/23206* (2013.01); *H04N 5/77* (2013.01); *H04N 21/44213* (2013.01); *H04N 21/854* (2013.01); *G06F 2203/011* (2013.01)

(58) Field of Classification Search
USPC .......................................................... 382/100
See application file for complete search history.

(56) References Cited

U.S. PATENT DOCUMENTS

| | | | | |
|---|---|---|---|---|
| 7,953,254 | B2* | 5/2011 | Seo | G06F 17/30032 382/118 |
| 8,237,742 | B2* | 8/2012 | Basson | G06F 19/3437 345/547 |
| 8,345,934 | B2* | 1/2013 | Obrador | G06K 9/00677 382/100 |
| 8,488,023 | B2* | 7/2013 | Bacivarov | G06K 9/00281 348/239 |
| 8,923,551 | B1* | 12/2014 | Grosz | H04N 1/00145 382/100 |
| 9,106,812 | B1 | 8/2015 | Price et al. | |
| 9,298,744 | B2* | 3/2016 | Pathak | G06F 17/3028 |
| 2003/0117651 | A1* | 6/2003 | Matraszek | G06F 17/30265 358/1.18 |
| 2009/0024469 | A1 | 1/2009 | Broder et al. | |
| 2011/0246182 | A1 | 10/2011 | Allen | |
| 2012/0082401 | A1* | 4/2012 | Berger | G06F 17/3028 382/306 |
| 2014/0031114 | A1 | 1/2014 | Davison et al. | |

* cited by examiner

FACILITATING PERSONAL ASSISTANCE FOR CURATION OF MULTIMEDIA AND GENERATION OF STORIES AT COMPUTING DEVICES

FIELD

Embodiments described herein generally relate to computers. More particularly, embodiments relate to facilitating personal assistance for curation of multimedia and generation of stories at computing devices.

BACKGROUND

With the increase in the use and availability of mobile computers and social networking applications, there has been a corresponding increase in user interest in obtaining, organizing, and sharing of media, such as photos, videos, etc. Although there are software applications claiming to offer solutions for organizing media, these conventional techniques are severely limited in that they require their users to perform manual organization of their media, such as collecting and organizing pictures by themes, events, etc. Thus, such conventional techniques require a great deal of effort on part of the users and are time-consuming, inefficient, and prone to errors.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Figure 1:
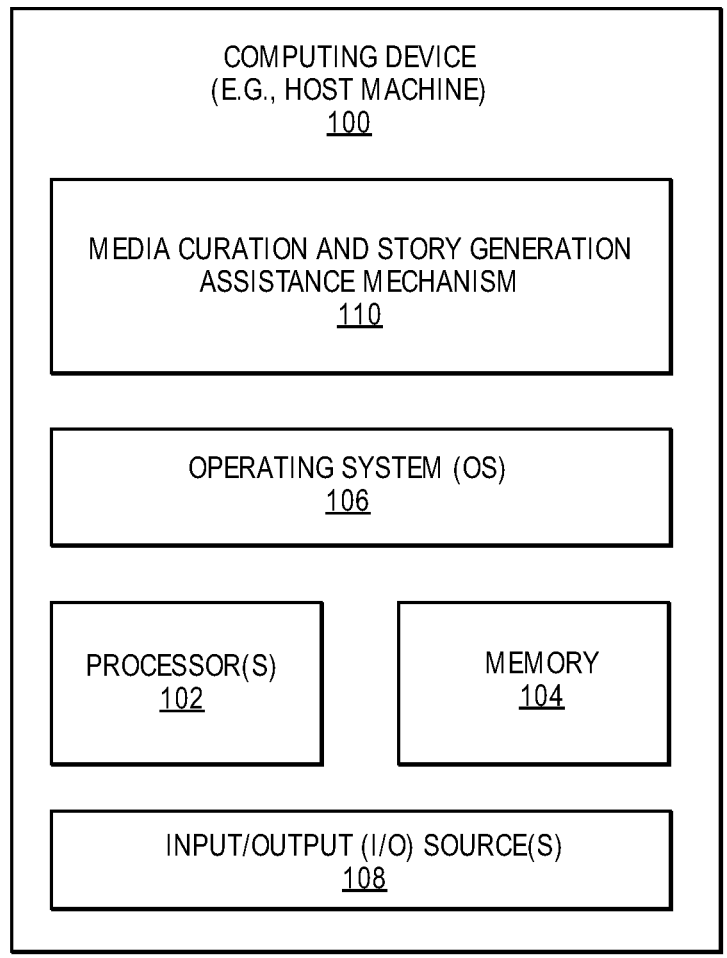
FIG. 1 illustrates a computing device employing a media curation and story generation assistance mechanism according to one embodiment.

In the following description, numerous specific details are set forth. However, embodiments, as described herein, may be practiced without these specific details. In other instances, well-known circuits, structures and techniques have not been shown in details in order not to obscure the understanding of this description.

Embodiments provide for a technique serving as an intelligent and efficient personal assistant to help users with automatic and dynamic curation of multimedia items (also referenced as "media items", "media assets" or simply "media") (e.g., photos, live or recorded videos, live or recorded audios, live chatter between users, voice messages, text messages, comments posted on websites by users, feedback received from users, television programs, movies, webpages, online posts, blogs, shows, games, concerts, lectures, etc.) to create stories that are capable of being experienced, shared, and offered. For example, a story based on pictures may be such that the pictures become performers in the story to showcase goal driven themes and emotions.

It is to be noted that "curation" refers to or includes (without limitation) selection, observation, collection, preservation, maintenance, organizing, sorting, filtering, archiving, etc., of any number and type of media items. It is further contemplated the media may be obtained from any number and type of media sources or tools, such as (without limitation) cameras, websites (e.g., social media, social networking websites, business networking websites, news websites, blogs, etc.), input/output devices (e.g., cameras, microphones, sensors (e.g., voice sensors, context sensors, ambient environment sensors, temperature/weather sensors, etc.), detectors (e.g., global positioning system (GPS) components), speakers, loud-speakers projectors, etc.), computing devices, live broadcasts, recorded broadcasts, Blu-ray disk (BD) players, digital video disc (DVD) players, compact disk (CD) players, databases, data sources, repositories, and/or the like.

In one embodiment, a series of pre-computed (also referred to as "predefined" or "predetermined") filters may used to select a desired goal for a user and then, automatically generate a real-time dynamic clustering of pictures, titles, story hashtags, etc., for a compelling experience to be consumed by the user or shared by the user with others who might be interested in reading about the experience. Further, in one embodiment, any number and type of cognitive techniques may be employed to leverage the media's metadata (such as a person "smiling" in a picture) to be used in creating relevant stories.

Conventional techniques are manual and thus do not provided for automation or even semi-automation of media curation and instead rely on at most some of heuristic selection and temporal or spatio-temporal ordering of images, etc. For example, most conventional techniques do not allow for the user to interact with a system to create a story using the user's media, such as pictures, videos, etc., because such techniques are manual where the user is required to do all the hard work or entirely ignored.

Embodiments provide for a comprehensive approach to automated and dynamic media curation that takes into account and accordingly extracts any number and type of user-related factors, such as goals, themes, emotions, preferences, beliefs, etc., from any number and type of media sources, such as social networking websites, etc., and contextual channels to author or co-author media streams using contextual and semantic understanding of metadata (e.g., comments, likes, titles, descriptions, locations, weather, events, and/or the like) from various media, such as photos, videos, etc. Embodiments further provide for merging of media, such as pictures, from various channels to create more personalized and comprehensive stories, interactively edit such stories, share the stories with other users, publish these stories as templates for free or in a marketplace for monetary gains for others to use and re-use, and/or the like. For example, as will be referenced throughout this document, a template may not be an actual story (such as will all image, etc.), but that metadata and meta-descriptions that are interpreted by media story mechanism 110 of FIG. 1 to generate similar stories for others. Further, for example, users may not wish to share pictures of their kids in a marketplace, but other information, such as themes, paths, etc., may be shared and used to lead to creation of stories, etc.

FIG. 1 illustrates a computing device 100 employing a media curation and story generation assistance mechanism 110 according to one embodiment. Computing device 100 serves as a host machine for hosting media curation and story generation assistance mechanism ("media story mechanism") 110 that includes any number and type of components, as illustrated in FIG. 2, to efficiently employ one or more components to facilitate personal assistance for automatic and dynamic curation of media as will be further described throughout this document.

Computing device 100 may include any number and type of data processing devices, such as large computing systems, such as server computers, desktop computers, etc., and may further include set-top boxes (e.g., Internet-based cable television set-top boxes, etc.), global positioning system (GPS)-based devices, etc. Computing device 100 may include mobile computing devices serving as communication devices, such as cellular phones including smartphones, personal digital assistants (PDAs), tablet computers, laptop computers (e.g., Ultrabook™ system, etc.), e-readers, media internet devices (MIDs), media players, smart televisions, television platforms, intelligent devices, computing dust, media players, head-mounted displays (HMDs) (e.g., wearable glasses, such as Google® Glass™, head-mounted binoculars, gaming displays, military headwear, etc.), and other wearable devices (e.g., smart watches, bracelets, smartcards, jewelry, clothing items, etc.), and/or the like.

Computing device 100 may include an operating system (OS) 106 serving as an interface between hardware and/or physical resources of the computer device 100 and a user. Computing device 100 further includes one or more processors 102, memory devices 104, network devices, drivers, or the like, as well as input/output (I/O) sources 108, such as touchscreens, touch panels, touch pads, virtual or regular keyboards, virtual or regular mice, etc.

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", "code", "software code", and the like, may be used interchangeably throughout this document. Also, terms like "job", "input", "request", "message", and the like, may be used interchangeably throughout this document. It is contemplated that the term "user" may refer to an individual or a group of individuals using or having access to computing device 100.

Figure 2A:
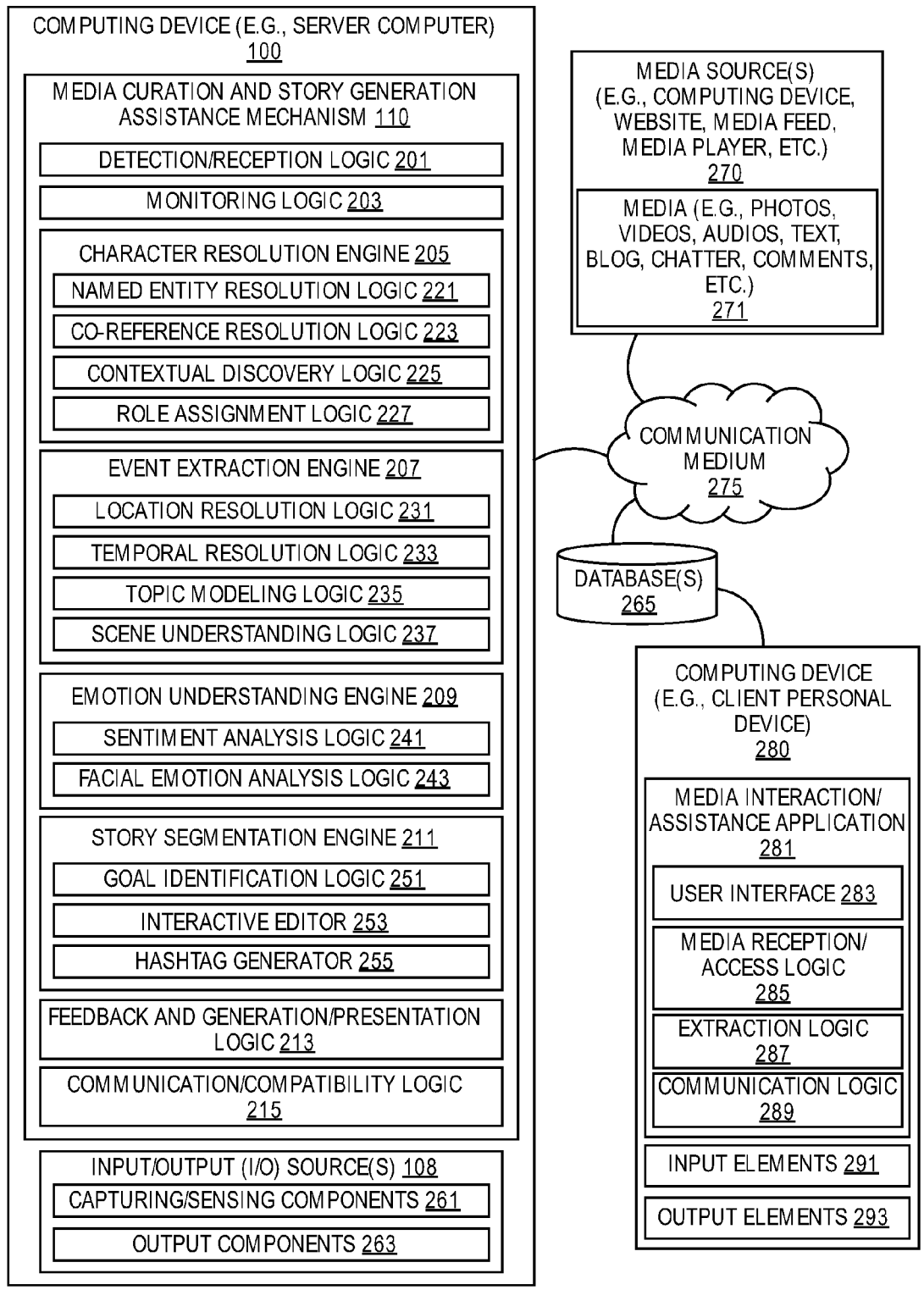
FIG. 2A illustrates a media curation and story generation assistance mechanism according to one embodiment.

FIG. 2A illustrates a media curation and story generation assistance mechanism 110 according to one embodiment. In one embodiment, media story mechanism 110 may include any number and type of components, such as (without limitation): detection/reception logic 201; monitoring logic 203; character resolution engine 205; event extraction engine 207; emotion understanding engine 209; and story segmentation engine 211; feedback and generation/presentation logic 213; and communication/compatibility logic 215. In one embodiment, computing device 100 further includes input/out sources 108 including capturing/sensing components 261 and output components 263.

Further, in one embodiment, character resolution engine 205 may include named entity resolution logic 221, co-reference resolution logic 223, contextual discovery logic 225, and role assignment logic 227; event extraction engine 207 may include location resolution logic 231, temporal resolution logic 233, topic modeling 235, and scene understanding 237; emotion understanding engine 209 may include sentiment analysis logic 241 and facial emotion analysis logic 243; and story segmentation engine 211 may include goal identification logic 251, interactive editor 253, and hashtag generator 255.

Computing device 100 may be in communication with media source(s) 270 (e.g., websites (such as social networking websites, business networking websites, personal websites, company websites, etc.) media players, cameras, databases, data sources, repositories, computing devices (such as third-party computing devices, etc.), and/or the like) over communication medium 275 (e.g., communication channels or networks, such as Cloud network, the Internet, proximity network, Bluetooth, etc.) and further in communication with one or more computing devices (also referred to as "client computers", "client devices", or simply "personal devices"), such as person device 280 (e.g., desktop computer, mobile computer, wearable computing device, etc.), over communication medium 275. In one embodiment, media source(s) 270, such as media player, another computing device, etc., may be separately located and be remotely in communication with personal device 280 over communication medium 275.

In another embodiment, media source(s) 270, such as camera, website, etc., may be part of or access through personal device 280. In yet another embodiment, media source(s) 270 may be media feeds (e.g., social/business networking websites, such as Facebook®, Twitter®, Pinterest®, LinkedIn®, etc.) that are direct accessible via user interface 283 as facilitated by media feed reception/access logic 285 of media interaction/assistance application ("media application") 281 at personal device 280 or through one or more other personal devices. It is further contemplated and to be noted that personal device 280 may refer to or include computing devices having all their components, such as processor(s) 102, memory 104, operation system 106, etc., as illustrated with reference to computing device 100 in FIG. 1.

As illustrated, in one embodiment, personal device 280 may host media application 281 that includes user interface 283, media feed reception/access logic ("reception/access logic") 285, extraction logic 287, and communication logic 289. Personal device 280, like computing device 100, may also include any number and type of input elements 291 (e.g., 2D cameras, 3D cameras, microphones, sensors, detectors, etc.) and output elements 293 (e.g., display screens, projectors, speakers, etc.) for receiving/capturing media inputs and providing/playing media outputs, respectively, to assist media application 281 which, in turn, communicates and works with media story mechanism 110 for automatic and dynamic curation of media items and generation of stories.

It is contemplated and to be noted that in one embodiment, media story mechanism 110 may be entirely hosted at computing device 100 (e.g., server computer, desktop computer, laptop computer, mobile computer, etc.) and be in communication with one or more personal devices, such as personal device 280, over communication medium 275, such as Cloud network, proximity network, the Internet, etc. In another embodiment, media story mechanism 110 may be entirely hosted at personal device 280 (e.g., laptop computer, mobile or wearable computers, such as tablet computers, smartphones, smartcards, wearable glasses, smart jewelry, smart clothing items, etc.), such as wholly or partially as part of media application 281.

In yet another embodiment, media story mechanism 110 may be partially employed at both computing device 100 and personal device 280, such as one or more components of media story mechanism 110 may be hosted by computing device 100, and one or more components of media story mechanism 110 may be hosted by personal device 280. For example, a large personal device 280 (e.g., desktop computer, etc.) having a great deal of resources, capacity, power, etc., may employ media story mechanism 110, while a small personal device 280 (e.g., mobile computer, such as smartphone, tablet computer, etc.) with limited resources may not employ media story mechanism 110 and instead be limited to employing media application 281 in communication with media story mechanism 110 over communication medium 275.

In one embodiment, computing device 100 may be further in communication with one or more database(s) 265 including one or more repositories or data sources to obtain, communicate, store, and maintain any amount and type of data (e.g., media items, metadata, real-time data, historical contents, user and/or device identification and other information, resources, policies, criteria, rules and regulations, upgrades, etc.). In one embodiment, media source(s) 280 may also include one or more computing device, such as third-party computing device, to serve, obtain, communicate, store, and maintain any amount and type of data, such as media items, metadata, real-time data, historical contents, user and/or device identification and other information, etc.). In one embodiment, communication medium 275 may include any number and type of communication channels or networks, such as Cloud network, the Internet, intranet, Internet of Things ("IoT"), proximity network, Bluetooth, etc.). It is contemplated that embodiments are not limited to any particular number or type of computing devices, media sources, databases, personal devices, networks, etc.

Computing device 100 may further include I/O sources 108 having any number and type of capturing/sensing components 261 (e.g., sensor array (such as context/context-aware sensors and environmental sensors, such as camera sensors, ambient light sensors, Red Green Blue (RGB) sensors, etc.), depth sensing cameras, two-dimensional (2D) cameras, three-dimensional (3D) cameras, image sources, audio/video/signal detectors, microphones, eye/gaze-tracking systems, head-tracking systems, etc.) and output components 263 (e.g., audio/video/signal sources, display planes, display panels, display screens/devices, projectors, display/projection areas, speakers, etc.).

Capturing/sensing components 261 may further include one or more of vibration components, tactile components, conductance elements, biometric sensors, chemical detectors, signal detectors, electroencephalography, functional near-infrared spectroscopy, wave detectors, force sensors (e.g., accelerometers), illuminators, eye-tracking or gaze-tracking system, head-tracking system, etc., that may be used for capturing any amount and type of visual data, such as images (e.g., photos, videos, movies, audio/video streams, etc.), and non-visual data, such as audio streams or signals (e.g., sound, noise, vibration, ultrasound, etc.), radio waves (e.g., wireless signals, such as wireless signals having data, metadata, signs, etc.), chemical changes or properties (e.g., humidity, body temperature, etc.), biometric readings (e.g., figure prints, etc.), brainwaves, brain circulation, environmental/weather conditions, maps, etc. It is contemplated that "sensor" and "detector" may be referenced interchangeably throughout this document. It is further contemplated that one or more capturing/sensing components 261 may further include one or more of supporting or supplemental devices for capturing and/or sensing of data, such as illuminators (e.g., infrared (IR) illuminator), light fixtures, generators, sound blockers, etc.

It is further contemplated that in one embodiment, capturing/sensing components 261 may further include any number and type of context sensors (e.g., linear accelerometer) for sensing or detecting any number and type of contexts (e.g., estimating horizon, linear acceleration, etc., relating to a mobile computing device, etc.). For example, capturing/sensing components 261 may include any number and type of sensors, such as (without limitations): accelerometers (e.g., linear accelerometer to measure linear acceleration, etc.); inertial devices (e.g., inertial accelerometers, inertial gyroscopes, micro-electro-mechanical systems (MEMS) gyroscopes, inertial navigators, etc.); gravity gradiometers to study and measure variations in gravitation acceleration due to gravity, etc.

Further, for example, capturing/sensing components 261 may include (without limitations): audio/visual devices (e.g., cameras, microphones, speakers, etc.); context-aware sensors (e.g., temperature sensors, facial expression and feature measurement sensors working with one or more cameras of audio/visual devices, environment sensors (such as to sense background colors, lights, etc.), biometric sensors (such as to detect fingerprints, etc.), calendar maintenance and reading device), etc.; global positioning system (GPS) sensors; resource requestor; and trusted execution environment (TEE) logic. TEE logic may be employed separately or be part of resource requestor and/or an I/O subsystem, etc. Capturing/sensing components 261 may further include voice recognition devices, photo recognition devices, facial and other body recognition components, voice-to-text conversion components, etc.

Computing device 100 may further include one or more output components 263 in communication with one or more capturing/sensing components 261 and one or more components of media mechanism 110 for facilitating playing and/or visualizing of varying contents, such as images, videos, texts, audios, animations, interactive representations, visualization of fingerprints, visualization of touch, smell, and/or other sense-related experiences, etc. For example, output components 263 may further include one or more telepresence projectors to project a real image's virtual representation capable of being floated in mid-air while being interactive and having the depth of a real-life object.

Further, output components 263 may include tactile effectors as an example of presenting visualization of touch, where an embodiment of such may be ultrasonic generators that can send signals in space which, when reaching, for example, human fingers can cause tactile sensation or like feeling on the fingers. Further, for example and in one embodiment, output components 263 may include (without limitation) one or more of light sources, display devices and/or screens, audio speakers, tactile components, conductance elements, bone conducting speakers, olfactory or smell visual and/or non/visual presentation devices, haptic or touch visual and/or non-visual presentation devices, animation display devices, biometric display devices, X-ray display devices, high-resolution displays, high-dynamic range displays, multi-view displays, and head-mounted displays (HMDs) for at least one of virtual reality (VR) and augmented reality (AR), etc.

As will be further described throughout this document, in one embodiment, media may be obtained from one or more social media feeds (e.g., social networking websites, such as Facebook®, Pinterest®, Twitter®, etc.) through one or more media sources 270 that are capable of being accessed at personal device 280, such as using reception/access logic 285, and/or one or more other personal device, etc. Further, live audio media (e.g., comments, chatter, people talking while a picture is being taken, etc.) may be captured through one or more input elements 291, such as microphones, etc. Similarly, other forms of media, such as text, pictures, etc., may be captured through one or more input elements 291, such as readers, scanners, cameras, etc.

In one embodiment, once any number of media items (e.g., photos, text messages, voice chatter, etc.,) are received or captured from one or more of media sources 270 using one or more of user interface 281, input elements 291, output elements 293, etc., as facilitated by media logic 285, any number and type of contexts (e.g., emotions, sentiments, moods, modes (such as play mode, work mode, and family mode, etc.), environmental changes, ambient atmosphere, events, locations, and/or the like) may be extracted from the media using extraction logic 287.

In one embodiment, context may be extracted, in real-time, via extraction logic 287, by observing the media and any information, such as data, metadata, etc., relating to the media; for example, a person smiling in several photos during a vacation may indicate the person's general mood during the vacation, but a person laughing in one of ten photos and shown as being sad in the other nine photos may indicate an occurrence of something extraordinarily pleasant/happy to cause the person to laugh (and thus change the mood). Similarly, extraction logic 287 may be used to extract such contexts from any number and type of data/metadata, such as audio chatter (e.g., persons laughing, joking, being serious, crying, etc.), emoticons in text (e.g., smiley face, frown face, angry face, etc.), punctuations (e.g., exclamation points, periods, commas, etc.), visual indications in photos or videos (e.g., person smiling, jumping, resting, drinking, eyes wide open, teeth showing, wet clothes, sand on shoes, etc.), and/or the like.

In one embodiment, these extracted contexts may then be communicated on to media story mechanism 110 for further processing, such as by emotion understanding engine 209, where these extracted contexts are communicated, in real-time, using communication logic 289 and/or communication/compatibility logic 213. In one embodiment, contexts may be extracted and communicated in real-time or on-demand or based on a predetermined time schedule as set forth in user and/or system preferences.

As aforementioned, conventional techniques are incapable of relating to visually creating and expressing the intensity, emotions, and latent pleasures of moments captured via media sensing/capturing technologies. Current techniques are incapable of expressing rich emotions via media experiences to accomplish goals of fulfillment, narration, excitement, and other self-expressions.

Embodiments provide for a goal-driven visual story generation personal assistant system that takes into account characters, locations, events, and shared experiences and expressions via social media modalities to allow for visually-generated stories based on the personal media to a user. For example, in one embodiment, character resolution engine 205 may be used to extract characters and assign roles in narratives, event extraction engine 207 may be used to capture the clusters of episodic and topical themes and activities, emotion understanding engine 209 may be used to capture emotions and sentiments by characters in various events, and story segmentation engine 211 may be used to stitch together the media elements to create the story.

Although it is contemplated that embodiments are not limited to any particular devices, users, events, contexts, etc.; however, for the sake of brevity, clarity, and ease of understanding, throughout this document, a family vacation event may be referenced, such as a family of two adults and 2 children went on a vacation trip to one of the islands of Hawaii. They visited a bunch of tourist locations, captured hundreds of pictures and posted them one a social media website where they have received a number of comments relating to the posted pictures. They ate plenty of good food, performed activities, such as snorkeling, whale watching, helicopter ride, watching local music shows, doing morning yoga, etc. For the sake of brevity, terms like "user", "character", and "actor" may be referenced interchangeably throughout this document.

Now referring to media story mechanism 110, in one embodiment, detection/reception logic 201 may be triggered and used each time user requests, contexts, real-time data, historical data, etc., may be received at detection/reception logic 201. Further, detection/reception logic 201 may be used to perform any number and type of detection and/or reception tasks relating to one or more of capturing/sensing components 261, output components 263, etc., to detect various contents from personal device 280, media source(s) 270, database(s) 265, etc., over communication medium 240.

In one embodiment, upon receiving relevant user requests, contexts, and other data/metadata, etc., monitoring logic 203 may be triggered to begin monitoring of one or more processes of or tasks relating to automatic and dynamic media curation as performed by one or more components of media story mechanism 110.

As aforementioned, in one embodiment, character resolution engine 205 may be used to identify the main characters (e.g., family members) in the story (e.g., vacation story) and the relationship between characters. For example, characters may be represented as nodes in a graph, while their relationships may be represented as links between the nodes, such as a node representing the husband carries a link with a node representing his wife and the two nodes representing the two children, etc. Similarly, characters may include other individuals who come into contact with the vacationing family, etc.

For example and in one embodiment, named entity resolution logic ("named logic") 221 may be used to extract person entities from comments, descriptions, etc., while any pronouns and co-references may be resolved with a co-reference resolution natural language processing as facilitated by co-reference resolution logic ("co-reference logic") 223. Further, named logic 221 may be further used to build characters from tags associated with people or using face recognition techniques using images and previous tags of the same person, associated with the metadata in the media, or even physical proximity (such as levering Bluetooth metadata, etc.) as facilitated by contextual discovery logic 225 based on various proximity networks, such as Bluetooth, Wi-Fi, etc., of communication medium 275.

Further, in one embodiment, role assignment logic 227 may be used to for parsing and role assignment, such as parsing "who said what to whom" to assign roles on the links relating to the characters in the network graph based on various comments and descriptions, etc. It is contemplated that depending on the technology and as visual recognition and characterization techniques advance, additional metadata may be extracted and evaluated from the images. For example, if a person often looks smiling or doing a prank, then this data about the person may be added their profile and continuing with the example of the vacationing family, four main characters and the relationships between them are identified in the story (e.g., the overall story of the trip). Based on the titles and comments posted relating to the pictures, any interactions between the characters in the story are identified and, for example, given a picture of the father and a whale in the ocean along with a comment from the son, stating "I took that beautiful shot", a link between the father and the son, such as son(X) clicks picture of dad(Y), may be created. These relationship links may lead to creation of the prior seeds for generation of a network graph, such as the one shown in FIG. 3.

In one embodiment, event extraction engine 207 and its components 231-237 may use entities, time, and location information to extract relationships between various elements to acquire events and activities from the media. For example, various lexico-syntactic patterns and templates, such as Subject-VerbClass-Object patterns with specific instantiations of relevant verb groups, etc., may be used to extract local spatio-temporal relationships to extract potential events in the media stream. For example, locations of characters may be determined by location resolution logic 231 using one or more location detection techniques, such as global positioning system (GPS) coordinates, real-time location information posted/provided by one or more characters, etc., where such locations may include physical locations, semantic locations, etc. Similarly, in one embodiment, temporal resolution logic 233 may be used to determine time resolution to determined sequencing, such as 5 pictures relating to food out of 30 pictures to reflect a higher emphasis on food, but 3 pictures relating to food out of 1000 pictures reflects lesser emphasis on food, etc. Temporal resolution logic 233 also helps identify and compute time intervals of events from text as well as media streams using statistical correlations within media sequences.

In one embodiment, topic modeling logic 235 may be used to identify themes to explore a history of the media stream, such as themes corresponding to a business trip, a vacation, a birthday party, etc., as determined from, for example, one or more close-up shots of the characters. Similarly, in one embodiment, scene understanding logic 237 may be used to further zoom-in on them using hierarchical categorization and imaging techniques to reveal various aspects and scenes of the theme, such as a beautiful view at a lake, a sunset, or a painting at a museum, etc. In one embodiment, topic modeling algorithms may be triggered by topic modeling logic 235 to analyze the words of the media steams to discover the various themes that run through them and how such themes are connected to each other or change over time. Similarly, vision algorithms may be facilitated by scene understanding logic 237 to obtain a sense of possible scenarios that feed into the models for various scenes relating to one or more themes.

Moreover, knowing the location and time relating to a theme, additional local events information (such as any information posted on a website by the characters) may be used to compute correlations between the events from the media stream and local events (such as if the coincide). Further, a transfer learning approach may be used to make further inferences about the media in cases where sparse metadata (e.g., pictures not captured from a social networking website, etc.) is detected such that the inferences are applied to similar contexts of pictures that share the same date, location, similarities in images, etc.

In one embodiment, emotion understanding engine 209 includes sentiment analysis logic 241 and facial emotion analysis logic 243, wherein sentiment analysis logic 241 finds opinions of the comments' authors in the story. For example, sentiment analysis logic 241, as further disclosed in FIG. 2B, includes any number and type of components to extract polarity and affect from the associated text and image to determine various degrees of user-specific emotions in text. Further, sentiment analysis logic 241 may include various pipeline components for processing media stream metadata and the users' status messages.

Figure 2B:
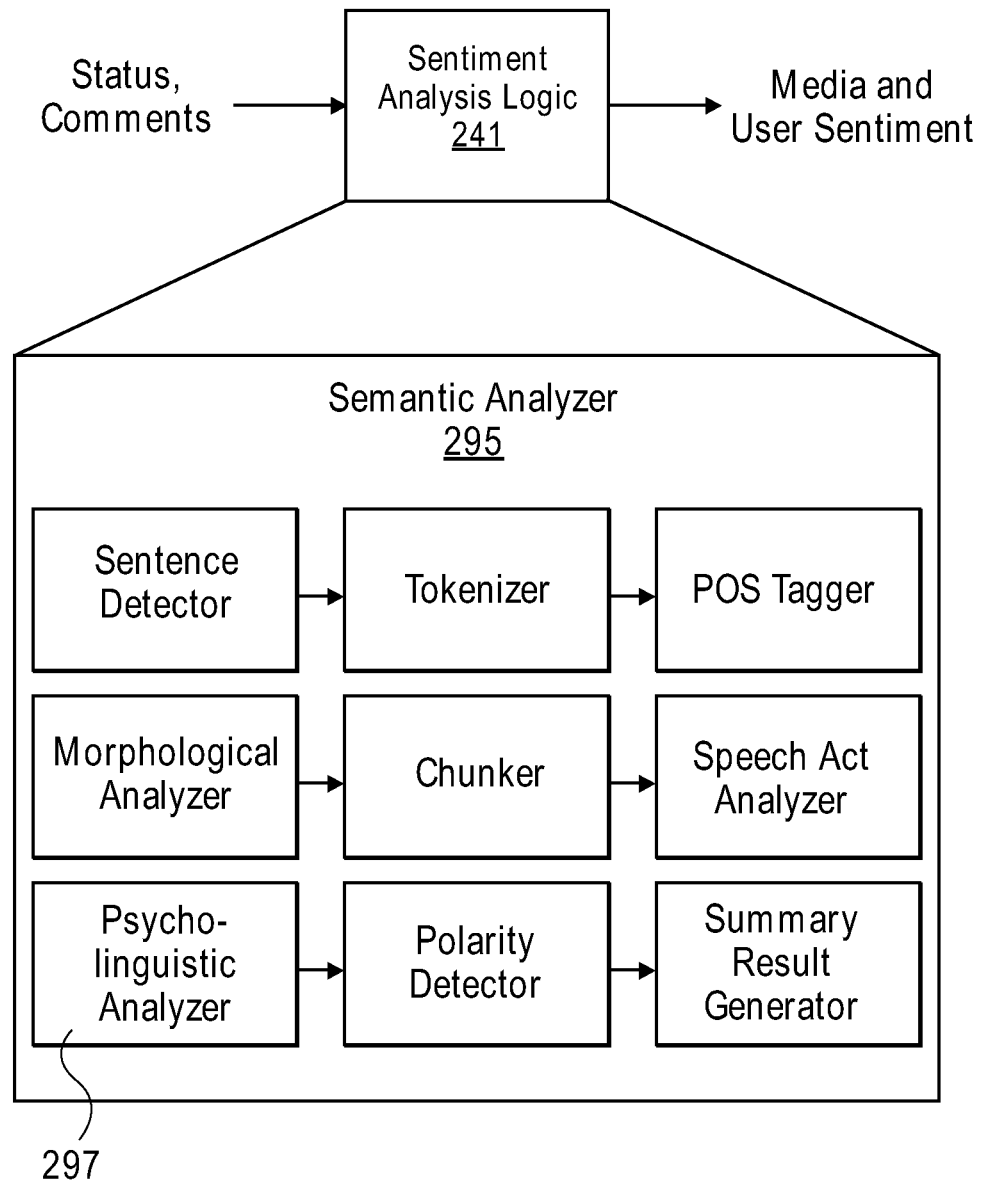
FIG. 2B illustrates sentiment analysis logic having a semantic analyzer according to one embodiment.

Referring to FIG. 2B, sentiment analysis logic 241 is shown to include semantic analyzer 295 including a pipeline of any number and type of modules, such as sentence detector, tokenizer, part-of-speech (POS) tagger, morphological analyzer, chunker, speech act analyzer, polarity detector, and summary result generator, etc., to receive and process status, comments, etc., and produce and send out media and user sentiments, where semantic analyzer 295 further includes psycho-linguistic analyzer 297. For example and in one embodiment, psycho-linguistic analyzer 297 may be used to analyze one or more of facial expressions of a character, such as one of the characters from the family trip, their audio chatter, facial expressions of others characters in the picture, other expressions (e.g., body language, clothing, etc.) in the same or other pictures taken within the proximity of the picture (e.g., within 3 pictures, within 30 minutes, etc.), text/comments from various posts on social network websites, etc., to automatically psycho-analyze the character, such as father/husband, to determine to he might be feeling, thinking, expecting, etc., such as feeling anxiety, thinking work problems, expecting trouble on the trip, etc.

Referring back to FIG. 2A, emotion understanding engine 209 may further include face emotion analysis logic 243 to work with one or more modules of sentiment analysis logic 241, such as psycho-linguistic analyzer 297, to determine characters' facial expressions and emotions, such as angry, anxious, sad, happy, worried, uncaring, etc. Further, for example, data from future pictures (with respect to a current picture) may be taken into consideration to determine the mood of an actor in the current picture even if the mood of the actor may not be extracted when only the current picture is observed, because, in many cases, the future pictures may tell an additional story which may not be so obvious from the current picture. Similarly, face emotion analysis logic 243 may be used to trigger algorithms for detecting emotions and excitement levels from actors' faces to detect a sense of mood of the actors and any other people in the relevant pictures.

Any data output (e.g., extracted, inferred, determined, etc.) of one or more of character resolution engine 204, event extraction engine 207, and emotion understanding engine 209 may be forwarded on to story segmentation engine 211 further processing. In one embodiment, story segmentation engine 211 may include goal identification logic 251, interactive editor 253, and hashtag generator 255 to perform one or more tasks of taking the data output and compiling a sequence of summarized media elements for the story along with relevant hashtags, as generated by hashtag generator 255, and description of the story as edited by interactive editor 253. For example, interactive editor 253 may be used to assist in selecting from a list of pre-filtered goals, as identified by goal identification logic 251, to generate a complete and relevant story. For example, goals may include "show me happiest moments of the trip", "craziest moments of the trip", "Indiana Jones® adventures", "the helicopter ride", and/or the like. Once the goal has been specified, story segmentation engine 211 may select the media elements that satisfy the constraints set by the goals, characters, themes, events, and sentiments. Further, global identification logic 251 of story segmentation engine 211 may be used for determining and computing possible paths of stories as illustrated with reference to FIG. 3.

In one embodiment, once story segmentation engine 211 has selected and/or prepared the various parts of the story, feedback and generation/presentation logic 213 may then be triggered to generate the final story or any number of stories to be presented one or more actors and any other users via one or more personal devices, such as personal device 280. For example, an actor/user, wife/mother, in the family vacation example, may choose to view a story using user interface 283, but may also choose to share the story with friends and family by emailing the story or simply posting it on a social networking website, such as Facebook®.

In one embodiment, feedback and generation/presentation logic 213 may be used to form other presentation forms of the story for the user to share with other users, such as a shorter form to be posted on Twitter®, a blog to be posted on a website for general public's consumption, and one or more templates of the story to be posted at a story marketplace website for any number and type of users to download and use for their own stories. It is contemplated that these templates may be provided free-of-charge to all or selective users or for a price/fee for the users to purchase one or more templates from the marketplace website.

Further, in one embodiment, interactive editor 253 of story segmentation engine 211 may be used to interactively edit the story, allowing a user to create their own version of the story for consumption of other users or general media. Further, interactive editor 253 may be used to merge any number and type of pictures of media 271 obtained from varying media sources 270 (e.g., cameras, networks, etc.) to seed as input into generating the story as facilitated by feedback and generation/presentation logic 213.

In one embodiment, various viewers/audience, including friends, family, unrelated readers, customers, etc., of story may provide feedback which may be receive at detection/reception logic 201 and processed by feedback and generation/presentation logic 213 to learn and extract the authoring user's preferences from the audience's point-of-view. These preferences may then be fed back into the story generation model as prepared by story segmentation engine 211 to add more constraints for future generation of more likeable or acceptable stories.

Further, in one embodiment, goals may be identified or defined and created by goal identification logic 251 using a pre-defined template chosen from a template library, such as provided at a story marketplace website, that may have been created using some other user's media and experiences. As aforementioned, the user, upon generating a story, may choose to publish one or more templates of the story on the story marketplace website, where the one or more templates may be used by other users as pre-defined templates to generate their own stories and further, these templates may be published and shared (e.g., downloaded) free of charge or, as an alternative, such templates may be published and shared (e.g., downloaded) for a fee/price.

Figure 3:
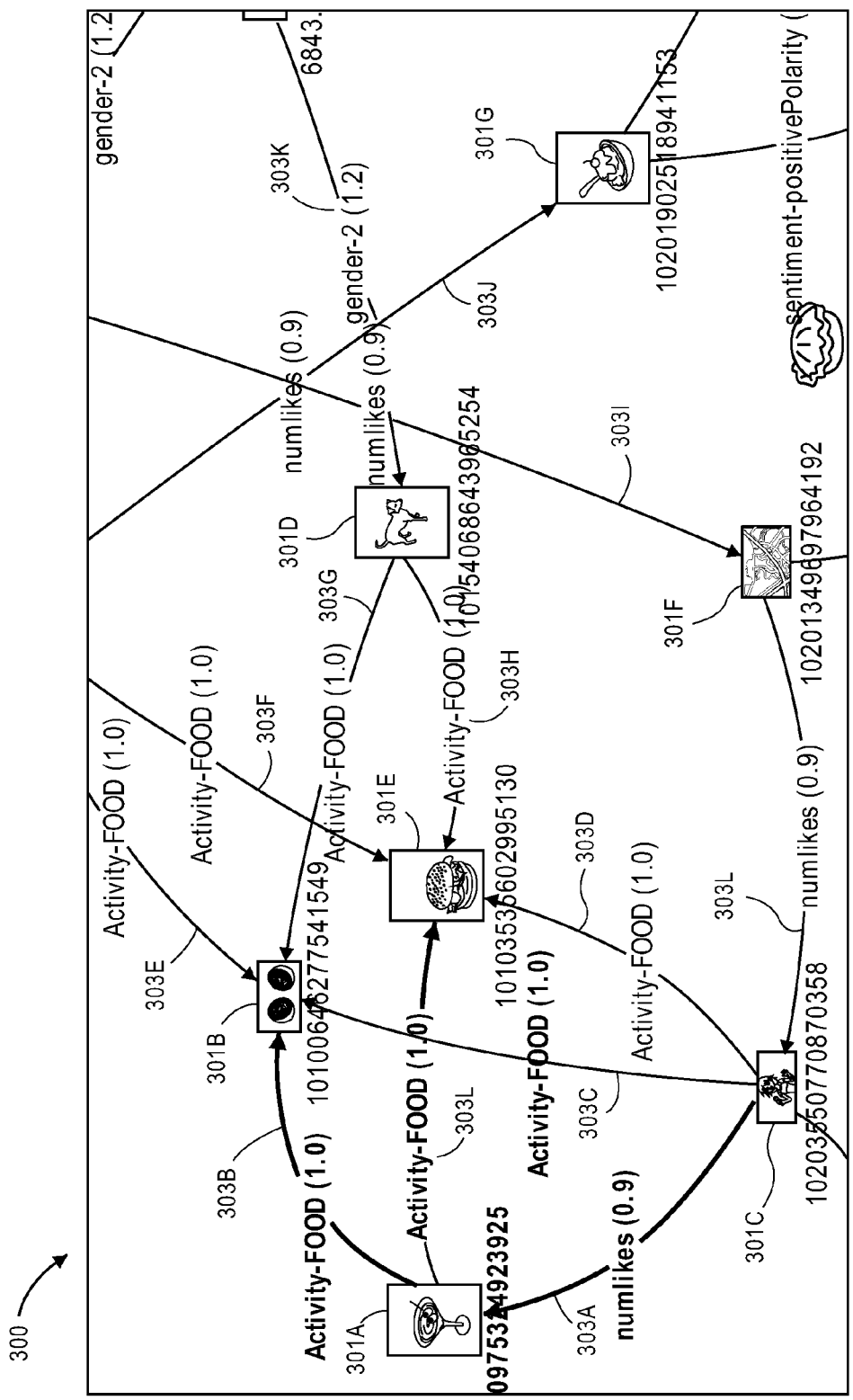
FIG. 3 illustrates a mapping scenario connecting characters through links according to one embodiment.

In one embodiment, another user (e.g., friend, family, unrelated user, etc.) may download a pre-defined story template of the user from the marketplace website over a network, such as cloud network, and use the downloaded story template to automatically generate a story of their own that is within the confines or parameters of the downloaded story template. For example, a pre-defined story template may be pre-populated with a theme (e.g., Mary Poppins), characters, objects, etc., which may then be used by the downloading user by simply inputting their own media (e.g., pictures, videos, comments, etc.) to generate their own story with the same theme (e.g., Mary Poppins), one or more of the same characters, objects, etc. In one embodiment, the pre-defined story template may also contain a pre-defined mapping criteria to generate a map/graph of characters, objects, links, etc., as illustrated in FIG. 3, which the user may choose to keep to auto-generate a similarly map or, as an alternative, override the pre-defined mapping criteria by manually generating their own map/graph of characters, objects, links, etc.

Communication/compatibility logic 215 may be used to facilitate dynamic communication and compatibility between computing device 100 and personal device 280, media source(s) 270, database(s) 265, etc., and any number and type of other computing devices (such as wearable computing devices, mobile computing devices, desktop computers, server computing devices, etc.), processing devices (e.g., central processing unit (CPU), graphics processing unit (GPU), etc.), capturing/sensing components (e.g., non-visual data sensors/detectors, such as audio sensors, olfactory sensors, haptic sensors, signal sensors, vibration sensors, chemicals detectors, radio wave detectors, force sensors, weather/temperature sensors, body/biometric sensors, scanners, etc., and visual data sensors/detectors, such as cameras, etc.), user/context-awareness components and/or identification/verification sensors/devices (such as biometric sensors/detectors, scanners, etc.), memory or storage devices, data sources, and/or database(s) (such as data storage devices, hard drives, solid-state drives, hard disks, memory cards or devices, memory circuits, etc.), network(s) (e.g., Cloud network, the Internet, intranet, cellular network, proximity networks, such as Bluetooth, Bluetooth low energy (BLE), Bluetooth Smart, Wi-Fi proximity, Radio Frequency Identification (RFID), Near Field Communication (NFC), Body Area Network (BAN), etc.), wireless or wired communications and relevant protocols (e.g., Wi-Fi®, WiMAX, Ethernet, etc.), connectivity and location management techniques, software applications/websites, (e.g., social and/or business networking websites, business applications, games and other entertainment applications, etc.), programming languages, etc., while ensuring compatibility with changing technologies, parameters, protocols, standards, etc.

Throughout this document, terms like "logic", "component", "module", "framework", "engine", "tool", and the like, may be referenced interchangeably and include, by way of example, software, hardware, and/or any combination of software and hardware, such as firmware. Further, any use of a particular brand, word, term, phrase, name, and/or acronym, such as "media", "metadata", "media curation" or "curation", "personal assistant", "media sources", "media feeds", "personal device", "story", "characters" or "actors", "context", "emotions", "templates", "social networking websites", "personal device", "smart device", "mobile computer", "wearable device", etc., should not be read to limit embodiments to software or devices that carry that label in products or in literature external to this document.

It is contemplated that any number and type of components may be added to and/or removed from media story mechanism 110 to facilitate various embodiments including adding, removing, and/or enhancing certain features. For brevity, clarity, and ease of understanding of media story mechanism 110, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 2C:
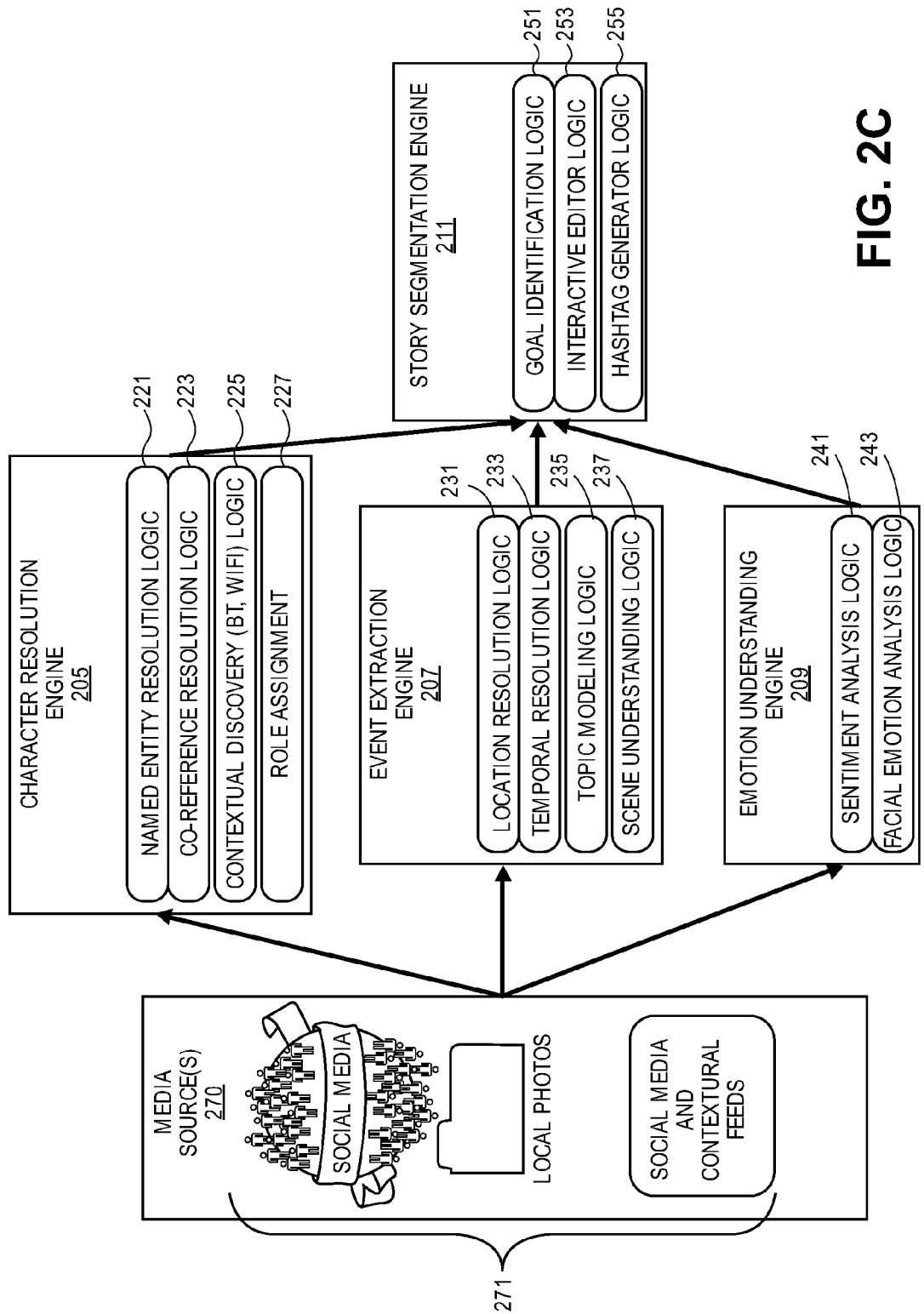
FIG. 2C illustrates an architectural placement according to one embodiment.

FIG. 2C illustrates an architectural placement 299 according to one embodiment. As an initial matter, for brevity, clarity, and ease of understanding, many of the components and processes discussed above with reference to FIGS. 1-2B may not be repeated or discussed hereafter. It is contemplated and to be noted that embodiments are not limited to the illustrated architectural placement 299.

As illustrated, in one embodiment, any amount and type of media 271 (e.g., social media website contents, photos/videos, other social media contextual feeds, etc.) are obtained form one or more media sources 270 and received at and used by character resolution engine 205, event extraction engine 207, and emotion understanding engine 209, and their respective components for processing as described with reference to FIG. 2A. For example and in one embodiment, character resolution engine 205 may include named entity resolution logic 221, co-reference resolution logic 223, contextual discovery logic 225, and role assignment logic 227. Similarly, event extraction engine 207 is shown to include location resolution logic 231, temporal resolution logic 233, topic modeling logic 235, and scene understanding logic 237. As illustrated, emotion understanding engine 209 includes sentiment analysis logic 241 and facial emotion analysis logic 243.

As described with reference to FIG. 2A, any data output from character resolution engine 205, event extraction engine 207, and emotion understanding engine 209 is forwarded onto and received at story segmentation engine 211 having goal identification logic 251, interactive editor 253, and hashtag generator 255 to generate a story based on the analyzed data and metadata relating to media 271 and the user.

FIG. 3 illustrates a mapping scenario 300 connecting characters 301A-G through links 303A-L according to one embodiment. As an initial matter, for brevity, clarity, and ease of understanding, many of the components and processes discussed above with reference to FIGS. 1-2C may not be repeated or discussed hereafter. It is contemplated and to be noted that embodiments are not limited to the illustrated mapping scenario 300.

In one embodiment, a story relating to an event, such as a business trip, a vacation, a party, a wedding, etc., may be formed using the available media, such as pictures taken during the event. It is contemplated that the picture may include or illustrate content that may be of interest to or even focus of the story relating to the event, where such content may include characters including actors or acting characters (e.g., humans, pets, etc.), such as members of family on a vacation, bride and groom during a wedding, a pet dog during birth, etc. Similarly, content of the relevant media, such as pictures, may also focus on objects that are non-actors or non-acting characters (e.g., plants, food, historic points of interest, natural scenery, other things, etc.), such as wine during a wine-tasting trip, food during a dinner party or a vacation trip, flowers in a garden, a company or a client during a business trip, the Pyramids during a trip to Egypt, etc.

In one embodiment, a story or a portion of a story may be curated around or focusing on a non-acting object, such as food, how it relates to one or more actors, such as family members during a vacation trip, etc., based on one or more factors extracted from relevant metadata, where such factors may include (without limitation) popularity, importance, gender, sentiment, relationship, etc.

For example and as illustrated, in one embodiment, a story is curated and defined as a path in a graph/map, such as mapping scenario 300, that is shown as connecting various pictures 301A-G of food or food related items from an event with similar or related metadata. For example, mapping scenario 300 illustrated various food-related moments in pictures 301A-G along with other shared context, such as and as aforementioned (without limitation) popularity, importance, gender, sentiment, relationship, etc.

In one embodiment, one or more components of media story mechanism 110 of FIG. 2A may be used to implement a recommendation algorithm that learns the importance of each metadata to model the popularity of a user's pictures within their own circle on a social networking website. The user may use media story mechanism 110 to suggest certain metadata, such as characters, themes, events, mix-and-match, to form certain recommendations such that the curated story 1) represents a personalized version of all possible paths as represented by links 303A-L joining pictures 301A-G in mapping scenario 300; and 2) is ranked by predicted popularity such that the user is also suggested which story or which part of a story is to be shared and with whom.

In one embodiment, story segmentation engine 211 of FIG. 2A may be used to conveniently remove one or more links of links 303A-L by filtering out one or more attributes with low statistical dependency. For example, a low value for "food activity" and "Rome" may indicate that, for example, "food activity in Rome" is not a likely part of any story in the user's collection of pictures, such as pictures 301A-G. Further, various important attributes as learned from and provided in mapping scenario 300 may represent, for example, a distribution of friends' interactions with the collection of pictures 301A-G based on, for example, relevance of context elements (e.g., locations, objects, etc.) relating to each picture of pictures 301A-G, etc. This way, a friend's preferences may be studied and additional stories may be curated, targeting specific audience.

As illustrated and discussed with reference to FIGS. 2A-C, any event, such as a business trip, a vacation, a party, a wedding, etc., may include any number of pictures of characters, such as persons who may be represented as actors at an event, as well as other characters which may form a focus of the event, such as food during a trip or at a party, a cake at a birthday party, a company or a client at a business trip, the pyramids in Egypt, bride and groom at a wedding, etc. For example, a picture may illustrate an item of focus, such as food, relating to one or more characters of the event.

In one embodiment, event pictures representing characters, such as pictures of characters 301A-G, may be regarded as actors serving as nodes in a graph/map, such as mapping scenario 300. With focus being the food, in the illustrated embodiment, characters 301A-G represent or relate to food. Further, as illustrated, in one embodiment, characters 301A-G are connected or linked with each other using various links, such as links 303A-L, where links 303A-L may include short links, long links, primary links, secondary links, tertiary links, etc.

Figure 4:
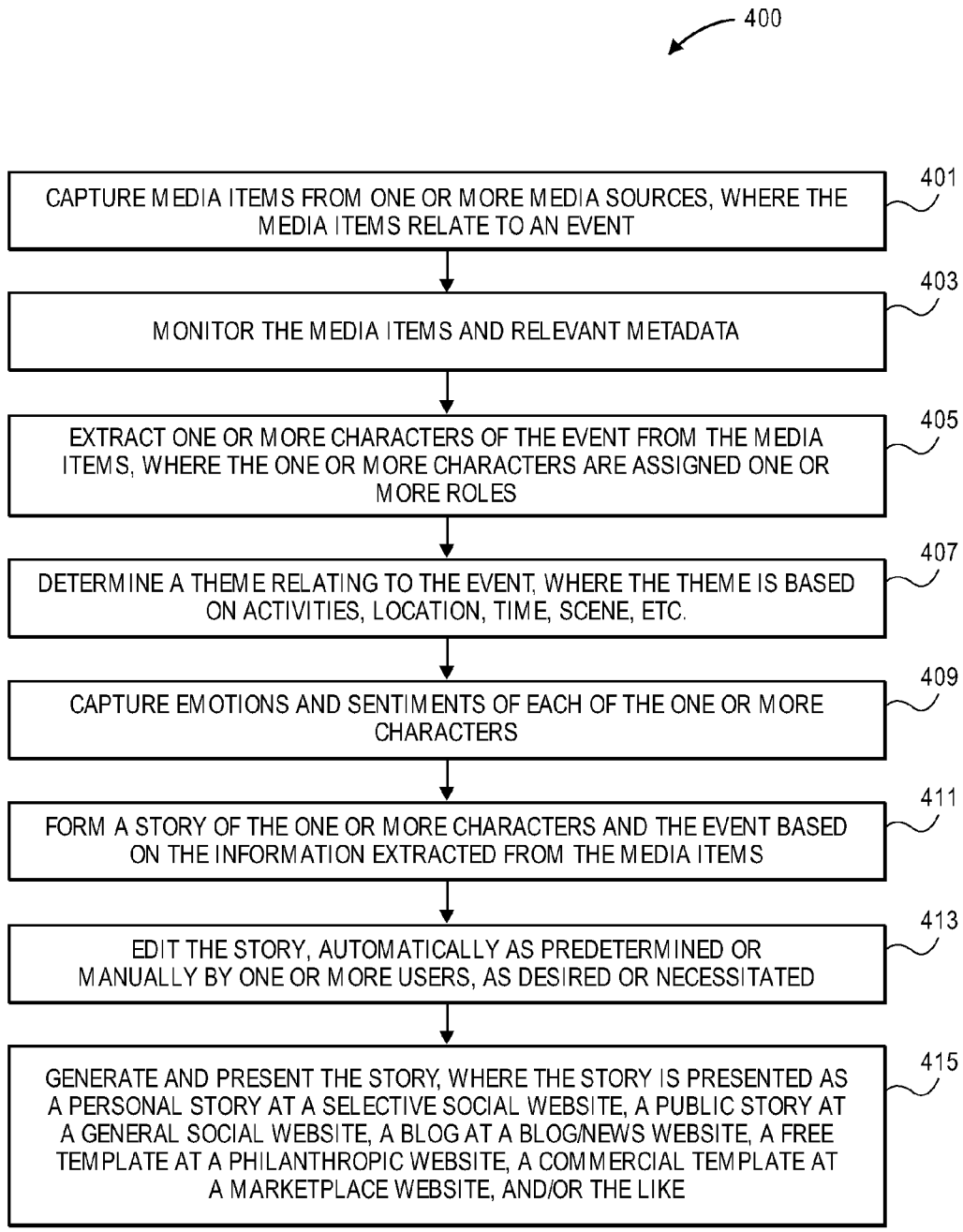
FIG. 4 illustrates a method for facilitating automatic and dynamic media curation for story generation according to one embodiment.

FIG. 4 illustrates a method 400 for facilitating automatic and dynamic media curation for story generation according to one embodiment. Method 400 may be performed by processing logic that may comprise hardware (e.g., circuitry, dedicated logic, programmable logic, etc.), software (such as instructions run on a processing device), or a combination thereof. In one embodiment, method 400 may be performed by media story mechanism 110 of FIG. 2A. The processes of method 400 are illustrated in linear sequences for brevity and clarity in presentation; however, it is contemplated that any number of them can be performed in parallel, asynchronously, or in different orders. For brevity, many of the details discussed with reference to the previous figures may not be discussed or repeated hereafter.

Method 400 begins at block 401 with capturing of media (e.g., photos, videos, comments, audio chatter, text messages, posts, etc.) from one or more media sources (e.g., websites, cameras, microphones, media players, etc.), where the capture media represents an event, such as a vacation trip, a business trip, a birthday party, a wedding, etc. At block 403, the media is monitored to facilitate one or more components of media story mechanism 110 of FIG. 2A to observe any metadata associated with the captured media to extract any amount and type of contexts, such as facial expressions, emotional state, ambient environment, climate, etc.

At block 405, in one embodiment, character resolution engine 205 of media story mechanism 110 of FIG. 2A is triggered to extract various characters (e.g., family on a vacation, friends at a party, bride and groom at a wedding, etc.) of the event represented by the media. Additionally, contextual discover of the characters may be performed to extract one or more locations, such as physical and other locations, of the characters may be determined along with their assigned roles in relation to the event. In one embodiment, the roles may be assigned upon discover the characters.

At block 407, in one embodiment, event extraction engine 207 of media story mechanism 110 of FIG. 2A may be used to capture various clusters of episodic and topical themes and activities relating to the event, such as performing location and temporal resolutions, topic modeling, and scene understanding, etc. At block 409, in one embodiment, emotion understanding engine 209 of media story mechanism 110 of FIG. 2A may be used to capture emotions and sentiments of each character involved in the media, such as a series of pictures, relating to the event and any other relevant events.

In one embodiment, at block 411, story segmentation engine 211 may then be triggered to stitch together the various media elements as determined by other components of media story mechanism 110 of FIG. 2A to generate a story model. In one embodiment, at block 413, the story model may be used by feedback and generation/presentation logic 213 to generate a story relating to the event involving its characters and based on the various information extracted about the event and the characters, where such information includes one or more of roles, locations, emotions, sentiments, expressions, environment, climate, occasion, etc.

In one embodiment, upon generating the story, the user may then choose to present the story as facilitated by feedback and generation/presentation logic 213, such as (without limitation): 1) share the story with selective friends and family by posting the story on one or more social networking websites; 2) provide it to generate public by posting the story on one or more websites that are more public in nature; 3) share the story as a blog on a news-related website; and 4) offer a template of the story on a marketplace website which may be altruistic or commercial in nature; and/or the like. Similarly, as previously discussed, in some embodiments, this story may have been generated using one or more pre-defined templates that the user may have obtained, such as downloaded, from one or more websites over a network, such as a marketplace website.

In some embodiments, the story may receive feedback in response to its posting one or more websites, etc., and in response, the user may choose to alter the story, such as remove offensive phrases or pictures, elaborate one or more features of the story, share the story with greater public, post one or more templates of the story, and/or the like. Similarly, the story have me generated based on the feedback already available from previous experiences, such as feedback received on past stories, etc.

Figure 5:
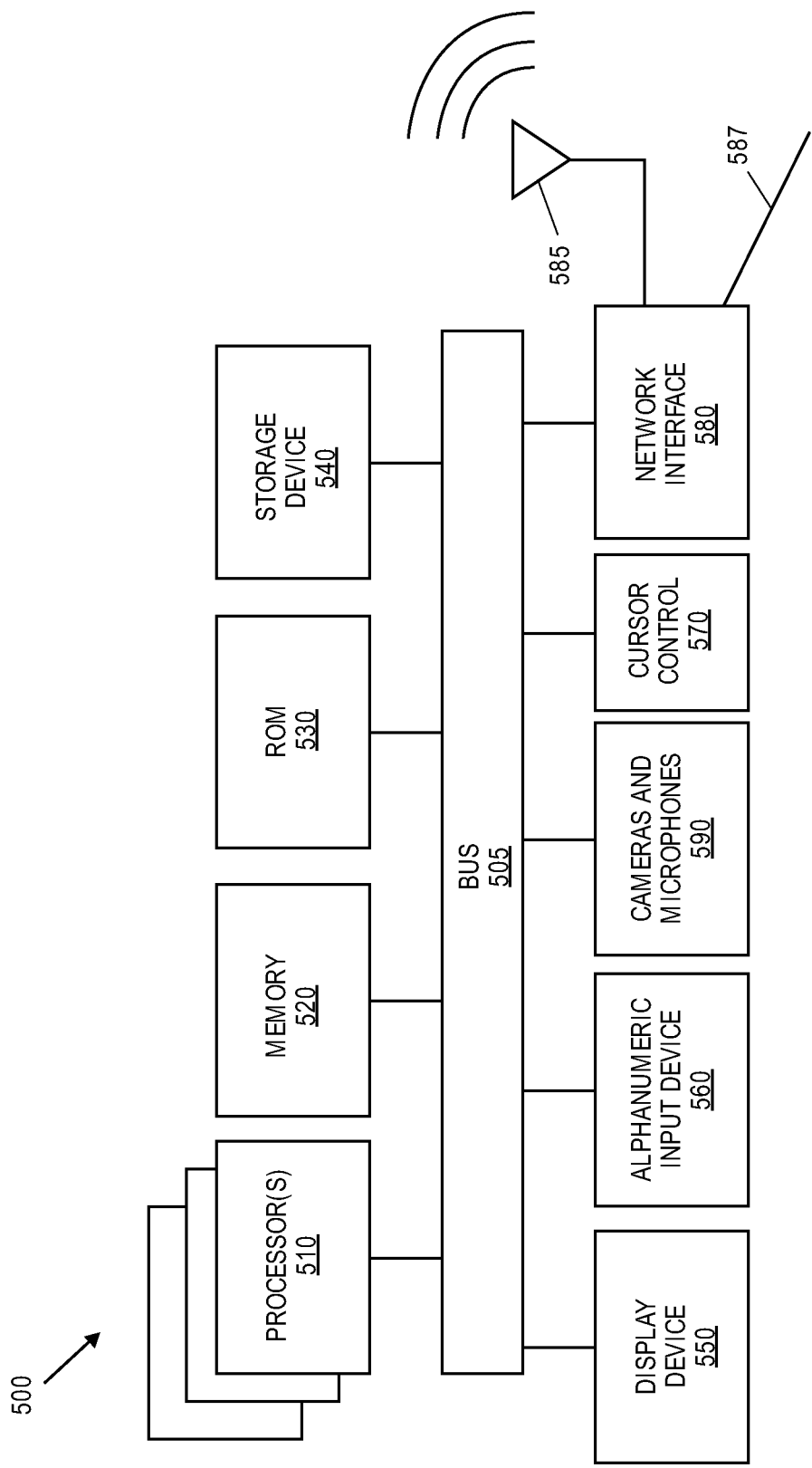
FIG. 5 illustrates computer environment suitable for implementing embodiments of the present disclosure according to one embodiment.

FIG. 5 illustrates an embodiment of a computing system 500 capable of supporting the operations discussed above. Computing system 500 represents a range of computing and electronic devices (wired or wireless) including, for example, desktop computing systems, laptop computing systems, cellular telephones, personal digital assistants (PDAs) including cellular-enabled PDAs, set top boxes, smartphones, tablets, wearable devices, etc. Alternate computing systems may include more, fewer and/or different components. Computing device 500 may be the same as or similar to or include computing devices 100 described in reference to FIG. 1.

Computing system 500 includes bus 505 (or, for example, a link, an interconnect, or another type of communication device or interface to communicate information) and processor 510 coupled to bus 505 that may process information. While computing system 500 is illustrated with a single processor, it may include multiple processors and/or co-processors, such as one or more of central processors, image signal processors, graphics processors, and vision processors, etc. Computing system 500 may further include random access memory (RAM) or other dynamic storage device 520 (referred to as main memory), coupled to bus 505 and may store information and instructions that may be executed by processor 510. Main memory 520 may also be used to store temporary variables or other intermediate information during execution of instructions by processor 510.

Computing system 500 may also include read only memory (ROM) and/or other storage device 530 coupled to bus 505 that may store static information and instructions for processor 510. Date storage device 540 may be coupled to bus 505 to store information and instructions. Date storage device 540, such as magnetic disk or optical disc and corresponding drive may be coupled to computing system 500.

Computing system 500 may also be coupled via bus 505 to display device 550, such as a cathode ray tube (CRT), liquid crystal display (LCD) or Organic Light Emitting Diode (OLED) array, to display information to a user. User input device 560, including alphanumeric and other keys, may be coupled to bus 505 to communicate information and command selections to processor 510. Another type of user input device 560 is cursor control 570, such as a mouse, a trackball, a touchscreen, a touchpad, or cursor direction keys to communicate direction information and command selections to processor 510 and to control cursor movement on display 550. Camera and microphone arrays 590 of computer system 500 may be coupled to bus 505 to observe gestures, record audio and video and to receive and transmit visual and audio commands.

Computing system 500 may further include network interface(s) 580 to provide access to a network, such as a local area network (LAN), a wide area network (WAN), a metropolitan area network (MAN), a personal area network (PAN), Bluetooth, a cloud network, a mobile network (e.g., 3rd Generation (3G), etc.), an intranet, the Internet, etc. Network interface(s) 580 may include, for example, a wireless network interface having antenna 585, which may represent one or more antenna(e). Network interface(s) 580 may also include, for example, a wired network interface to communicate with remote devices via network cable 587, which may be, for example, an Ethernet cable, a coaxial cable, a fiber optic cable, a serial cable, or a parallel cable.

Network interface(s) 580 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 580 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 580 may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 500 may vary from implementation to implementation depending upon numerous factors, such as price constraints, performance requirements, technological improvements, or other circumstances. Examples of the electronic device or computer system 500 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Figure 6:
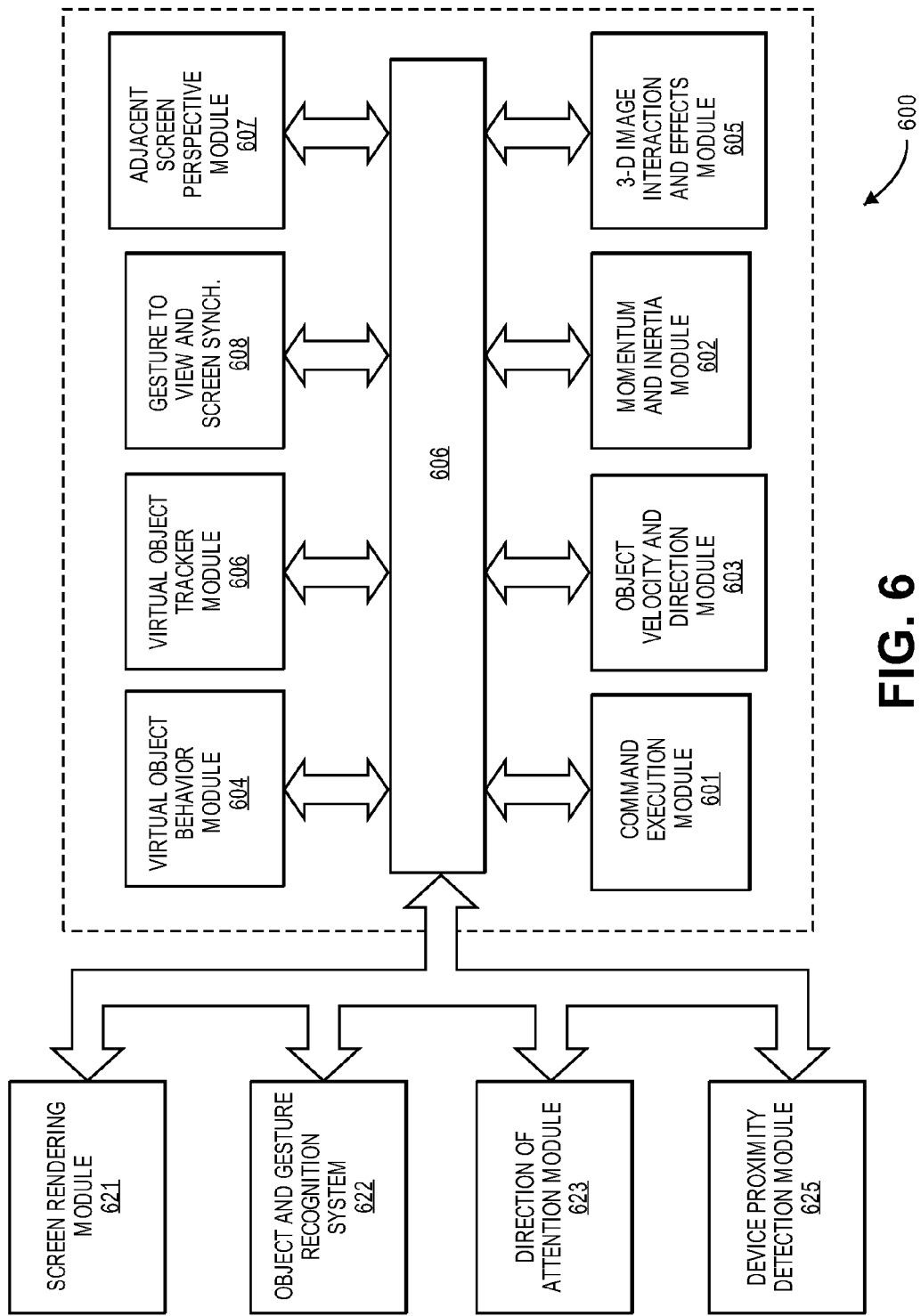
FIG. 6 illustrates a method for facilitating dynamic targeting of users and communicating of message according to one embodiment.

FIG. 6 illustrates an embodiment of a computing environment 600 capable of supporting the operations discussed above. The modules and systems can be implemented in a variety of different hardware architectures and form factors including that shown in FIG. 4.

The Command Execution Module 601 includes a central processing unit to cache and execute commands and to distribute tasks among the other modules and systems shown. It may include an instruction stack, a cache memory to store intermediate and final results, and mass memory to store applications and operating systems. The Command Execution Module may also serve as a central coordination and task allocation unit for the system.

The Screen Rendering Module 621 draws objects on the one or more multiple screens for the user to see. It can be adapted to receive the data from the Virtual Object Behavior Module 604, described below, and to render the virtual object and any other objects and forces on the appropriate screen or screens. Thus, the data from the Virtual Object Behavior Module would determine the position and dynamics of the virtual object and associated gestures, forces and objects, for example, and the Screen Rendering Module would depict the virtual object and associated objects and environment on a screen, accordingly. The Screen Rendering Module could further be adapted to receive data from the Adjacent Screen Perspective Module 607, described below, to either depict a target landing area for the virtual object if the virtual object could be moved to the display of the device with which the Adjacent Screen Perspective Module is associated. Thus, for example, if the virtual object is being moved from a main screen to an auxiliary screen, the Adjacent Screen Perspective Module 2 could send data to the Screen Rendering Module to suggest, for example in shadow form, one or more target landing areas for the virtual object on that track to a user's hand movements or eye movements.

The Object and Gesture Recognition System 622 may be adapted to recognize and track hand and harm gestures of a user. Such a module may be used to recognize hands, fingers, finger gestures, hand movements and a location of hands relative to displays. For example, the Object and Gesture Recognition Module could for example determine that a user made a body part gesture to drop or throw a virtual object onto one or the other of the multiple screens, or that the user made a body part gesture to move the virtual object to a bezel of one or the other of the multiple screens. The Object and Gesture Recognition System may be coupled to a camera or camera array, a microphone or microphone array, a touch screen or touch surface, or a pointing device, or some combination of these items, to detect gestures and commands from the user.

The touch screen or touch surface of the Object and Gesture Recognition System may include a touch screen sensor. Data from the sensor may be fed to hardware, software, firmware or a combination of the same to map the touch gesture of a user's hand on the screen or surface to a corresponding dynamic behavior of a virtual object. The sensor date may be used to momentum and inertia factors to allow a variety of momentum behavior for a virtual object based on input from the user's hand, such as a swipe rate of a user's finger relative to the screen. Pinching gestures may be interpreted as a command to lift a virtual object from the display screen, or to begin generating a virtual binding associated with the virtual object or to zoom in or out on a display. Similar commands may be generated by the Object and Gesture Recognition System using one or more cameras without benefit of a touch surface.

The Direction of Attention Module 623 may be equipped with cameras or other sensors to track the position or orientation of a user's face or hands. When a gesture or voice command is issued, the system can determine the appropriate screen for the gesture. In one example, a camera is mounted near each display to detect whether the user is facing that display. If so, then the direction of attention module information is provided to the Object and Gesture Recognition Module 622 to ensure that the gestures or commands are associated with the appropriate library for the active display. Similarly, if the user is looking away from all of the screens, then commands can be ignored.

The Device Proximity Detection Module 625 can use proximity sensors, compasses, GPS (global positioning system) receivers, personal area network radios, and other types of sensors, together with triangulation and other techniques to determine the proximity of other devices. Once a nearby device is detected, it can be registered to the system and its type can be determined as an input device or a display device or both. For an input device, received data may then be applied to the Object Gesture and Recognition System 622. For a display device, it may be considered by the Adjacent Screen Perspective Module 607.

The Virtual Object Behavior Module 604 is adapted to receive input from the Object Velocity and Direction Module, and to apply such input to a virtual object being shown in the display. Thus, for example, the Object and Gesture Recognition System would interpret a user gesture and by mapping the captured movements of a user's hand to recognized movements, the Virtual Object Tracker Module would associate the virtual object's position and movements to the movements as recognized by Object and Gesture Recognition System, the Object and Velocity and Direction Module would capture the dynamics of the virtual object's movements, and the Virtual Object Behavior Module would receive the input from the Object and Velocity and Direction Module to generate data that would direct the movements of the virtual object to correspond to the input from the Object and Velocity and Direction Module.

The Virtual Object Tracker Module 606 on the other hand may be adapted to track where a virtual object should be located in three dimensional space in a vicinity of an display, and which body part of the user is holding the virtual object, based on input from the Object and Gesture Recognition Module. The Virtual Object Tracker Module 606 may for example track a virtual object as it moves across and between screens and track which body part of the user is holding that virtual object. Tracking the body part that is holding the virtual object allows a continuous awareness of the body part's air movements, and thus an eventual awareness as to whether the virtual object has been released onto one or more screens.

The Gesture to View and Screen Synchronization Module 608, receives the selection of the view and screen or both from the Direction of Attention Module 623 and, in some cases, voice commands to determine which view is the active view and which screen is the active screen. It then causes the relevant gesture library to be loaded for the Object and Gesture Recognition System 622. Various views of an application on one or more screens can be associated with alternative gesture libraries or a set of gesture templates for a given view. As an example in FIG. 1A a pinch-release gesture launches a torpedo, but in FIG. 1B, the same gesture launches a depth charge.

The Adjacent Screen Perspective Module 607, which may include or be coupled to the Device Proximity Detection Module 625, may be adapted to determine an angle and position of one display relative to another display. A projected display includes, for example, an image projected onto a wall or screen. The ability to detect a proximity of a nearby screen and a corresponding angle or orientation of a display projected therefrom may for example be accomplished with either an infrared emitter and receiver, or electromagnetic or photo-detection sensing capability. For technologies that allow projected displays with touch input, the incoming video can be analyzed to determine the position of a projected display and to correct for the distortion caused by displaying at an angle. An accelerometer, magnetometer, compass, or camera can be used to determine the angle at which a device is being held while infrared emitters and cameras could allow the orientation of the screen device to be determined in relation to the sensors on an adjacent device. The Adjacent Screen Perspective Module 607 may, in this way, determine coordinates of an adjacent screen relative to its own screen coordinates. Thus, the Adjacent Screen Perspective Module may determine which devices are in proximity to each other, and further potential targets for moving one or more virtual object's across screens. The Adjacent Screen Perspective Module may further allow the position of the screens to be correlated to a model of three-dimensional space representing all of the existing objects and virtual objects.

The Object and Velocity and Direction Module 603 may be adapted to estimate the dynamics of a virtual object being moved, such as its trajectory, velocity (whether linear or angular), momentum (whether linear or angular), etc. by receiving input from the Virtual Object Tracker Module. The Object and Velocity and Direction Module may further be adapted to estimate dynamics of any physics forces, by for example estimating the acceleration, deflection, degree of stretching of a virtual binding, etc. and the dynamic behavior of a virtual object once released by a user's body part. The Object and Velocity and Direction Module may also use image motion, size and angle changes to estimate the velocity of objects, such as the velocity of hands and fingers The Momentum and Inertia Module 602 can use image motion, image size, and angle changes of objects in the image plane or in a three-dimensional space to estimate the velocity and direction of objects in the space or on a display. The Momentum and Inertia Module is coupled to the Object and Gesture Recognition System 622 to estimate the velocity of gestures performed by hands, fingers, and other body parts and then to apply those estimates to determine momentum and velocities to virtual objects that are to be affected by the gesture.

The 3D Image Interaction and Effects Module 605 tracks user interaction with 3D images that appear to extend out of one or more screens. The influence of objects in the z-axis (towards and away from the plane of the screen) can be calculated together with the relative influence of these objects upon each other. For example, an object thrown by a user gesture can be influenced by 3D objects in the foreground before the virtual object arrives at the plane of the screen. These objects may change the direction or velocity of the projectile or destroy it entirely. The object can be rendered by the 3D Image Interaction and Effects Module in the foreground on one or more of the displays.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes an apparatus to facilitate personal assistance for curation of multimedia and generation of stories at computing devices, comprising: detection/reception logic to receive one or more media items relating to an event; event extraction engine to capture a theme from the one or more media items, wherein the theme is captured based on at least one of activities, textual content, and scenes associated with the event; and story and scene segmentation engine to form a plurality of story elements to generate a story relating to the event, wherein the plurality of story elements are formed based on at least one of one or more characters, the theme associated with the event, and one or more emotions associated with the one or more characters, wherein the story is presented, via one or more display devices, to one or more users having access to the one or more display devices.

Example 2 includes the subject matter of Example 1, further comprising: character resolution engine to extract the one or more characters from the one or more media items, wherein the one or more characters having assigned one or more roles representing one or more individuals associated with the event; emotion understanding engine to determine the one or more emotions from the one or more media items, wherein the one or more emotions are determined based on one or more expressions associated with the one or more characters; and feedback and generation/presentation logic to generate the story based on the plurality of story elements, wherein the feedback and generation/presentation logic is further to facilitate posting of the story at one or more websites.

Example 3 includes the subject matter of Example 1 or 2, wherein the story is posted as at least one of a social posting at a social networking website, a blog posting at a news or blogging website, and a template posting having one or more story templates posted at a philanthropic website or a commercial website.

Example 4 includes the subject matter of Example 3, wherein the one or more story templates are downloadable by the one or more users to auto-generate stories using the one or more story templates having the plurality of elements associated with the story.

Example 5 includes the subject matter of Example 1, further comprising monitoring logic to monitor the one or more media items being received from one or more media sources over a communication medium, wherein the one or more media sources include at least one of a website, a media feed, a media player, a computing device, a sensor array, a camera, and a microphone, wherein the one or more media items include at least one of pictures, videos, audios, live chatter, text messages, postings, comments, feedbacks, and blogs.

Example 6 includes the subject matter of Example 1, wherein the character resolution engine further comprises: named entity resolution logic to extract, from the one or more media items, one or more identities or the one or more roles associated with the one or more characters wherein the one or more identities are extracted based on at least one of comments or descriptions associated with the one or more characters such that an identity associated with a character is detected based on at least one of a role, a comment, and a description associated with the character, wherein the identity refers to one or more of a parent, a child, a relative, a friend, a neighbor, a teammate, a coach, a boss, an employee, and a stranger; co-reference resolution logic to resolve one or more references relating to the one or more characters, wherein the one or more references include one or more pronouns associated with the one or more characters; contextual discovery logic to discover one or more locations of the event, wherein the one or more locations are discovered based on global positioning system (GPS) coordinates relating to one or more computing devices accessible to the one or more characters; and role assignment logic to determine the one or more roles associated with the one or more characters, wherein the role assignment logic is further to assign a role to a character of the one or more characters based on a comment regarding the character, wherein the one or more roles further refer to one or more relationships between two or more characters, wherein the one or more relationships include one or more of parent-child, brother-sister, aunt-nephew, grandfather-grandson, teammate-teammate, coach-player, neighbor-neighbor, boss-subordinate, owner-employee, partner-partner, and stranger-stranger.

Example 7 includes the subject matter of Example 1 or 6, wherein the event extraction engine further comprises: location resolution logic to extract location-related information relating to the one or more locations discovered based on the GPS coordinates, wherein the location-related information includes at least one of a local scene, a local culture, a local climate, a local language, a local time, and a local history, wherein the location-related information includes indigenous events or global events being performed locally such that the local scene includes a farmer's market, a garage sale, a beer festival, a new year's day celebration, a soccer world cup, and a royal coronation, wherein the theme is formed based on the location-related information; temporal resolution logic to extract time-related information relating to the one or more locations; topic modeling logic to statistically analyze words obtained from each of the one or more media items, wherein the theme is confirmed based on the statistically analyzed words; and scene understanding logic to analyze visible items in the one or more media items, wherein the visible items include at least one of objects, clothing, other individuals, animals, vegetation, weather, foregrounds, and backgrounds in each of the media items, wherein the backgrounds include one or more of color schemes, weather patterns, wall shades, and moods in imagery based on general scenery or photographic techniques, wherein the visible items are analyzed to determine a scene from the theme, wherein the scene understanding logic is further to analyze metadata associated with the visible items or the one or more characters in the one or more media items, the metadata being captured in real-time indicates relevant information about each of the visible items, the one or more characters, and the one or more roles or the one or more identities associated with the one or more characters.

Example 8 includes the subject matter of Example 1 or 6, wherein the emotion understanding engine further comprises: sentiment analysis logic to determine sentiments associated with each of the one or more characters and in each of the one or more media items, wherein the sentiments are determined based on semantic analysis of the metadata relating to one or more characters, wherein semantic analysis include psycho-linguistic analysis of the one or more characters; and facial emotion analysis logic to determine facial emotions associated with each of the one or more characters in one or more settings in each of the one or more media items.

Example 9 includes the subject matter of Example 1 or 6, wherein the story segmentation engine further comprises: goal identification logic to extract goals and sequence of elements of the story; interactive editor to facilitate editing of contents of the story; and hashtag generator to associate one or more hashtags to the story.

Some embodiments pertain to Example 10 that includes a method for facilitating personal assistance for curation of multimedia and generation of stories at computing devices, comprising: receiving, by one or more capturing/sensing components at a computing device, one or more media items relating to an event; capturing a theme from the one or more media items, wherein the theme is captured based on at least one of activities, textual content, and scenes associated with the event; and forming a plurality of story elements to generate a story relating to the event, wherein the plurality of story elements are formed based on at least one of one or more characters, the theme associated with the event, and one or more emotions associated with the one or more characters, wherein the story is presented, via one or more display devices, to one or more users having access to the one or more display devices.

Example 11 includes the subject matter of Example 10, further comprising: extracting the one or more characters from the one or more media items, wherein the one or more characters having assigned one or more roles representing one or more individuals associated with the event; determining the one or more emotions from the one or more media items, wherein the one or more emotions are determined based on one or more expressions associated with the one or more characters; and generating the story based on the plurality of story elements, wherein the story is posted at one or more websites.

Example 12 includes the subject matter of Example 10 or 11, wherein the story is posted as at least one of a social posting at a social networking website, a blog posting at a news or blogging website, and a template posting having one or more story templates posted at a philanthropic website or a commercial website.

Example 13 includes the subject matter of Example 12, wherein the one or more story templates are downloadable by the one or more users to auto-generate stories using the one or more story templates having the plurality of elements associated with the story.

Example 14 includes the subject matter of Example 10, further comprising monitoring the one or more media items being received from one or more media sources over a communication medium, wherein the one or more media sources include at least one of a website, a media feed, a media player, a computing device, a sensor array, a camera, and a microphone, wherein the one or more media items include at least one of pictures, videos, audios, live chatter, text messages, postings, comments, feedbacks, and blogs.

Example 15 includes the subject matter of Example 10, further comprising: extracting, from the one or more media items, one or more identities or the one or more roles associated with the one or more characters wherein the one or more identities are extracted based on at least one of comments or descriptions associated with the one or more characters such that an identity associated with a character is detected based on at least one of a role, a comment, and a description associated with the character, wherein the identity refers to one or more of a parent, a child, a relative, a friend, a neighbor, a teammate, a coach, a boss, an employee, and a stranger; resolving one or more references relating to the one or more characters, wherein the one or more references include one or more pronouns associated with the one or more characters; discovering one or more locations of the event, wherein the one or more locations are discovered based on global positioning system (GPS) coordinates relating to one or more computing devices accessible to the one or more characters; and determining the one or more roles associated with the one or more characters, wherein a role is assigned to a character of the one or more characters based on a comment regarding the character, wherein the one or more roles further refer to one or more relationships between two or more characters, wherein the one or more relationships include one or more of parent-child, brother-sister, aunt-nephew, grandfather-grandson, teammate-teammate, coach-player, neighbor-neighbor, boss-subordinate, owner-employee, partner-partner, and stranger-stranger.

Example 16 includes the subject matter of Example 10 or 15, further comprising: extracting location-related information relating to the one or more locations discovered based on the GPS coordinates, wherein the location-related information includes at least one of a local scene, a local culture, a local climate, a local language, a local time, and a local history, wherein the location-related information includes indigenous events or global events being performed locally such that the local scene includes a farmer's market, a garage sale, a beer festival, a new year's day celebration, a soccer world cup, and a royal coronation, wherein the theme is formed based on the location-related information; extracting time-related information relating to the one or more locations; statistically analyzing words obtained from each of the one or more media items, wherein the theme is confirmed based on the statistically analyzed words; and analyzing visible items in the one or more media items, wherein the visible items include at least one of objects, clothing, other individuals, animals, vegetation, weather, foregrounds, and backgrounds in each of the media items, wherein the backgrounds include one or more of color schemes, weather patterns, wall shades, and moods in imagery based on general scenery or photographic techniques, wherein the visible items are analyzed to determine a scene from the theme, wherein analyzing further includes analyzing metadata associated with the visible items or the one or more characters in the one or more media items, the metadata being captured in real-time indicates relevant information about each of the visible items, the one or more characters, and the one or more roles or the one or more identities associated with the one or more characters.

Example 17 includes the subject matter of Example 10 or 15, further comprising: determining sentiments associated with each of the one or more characters and in each of the one or more media items, wherein the sentiments are determined based on semantic analysis of the metadata relating to one or more characters, wherein semantic analysis include psycho-linguistic analysis of the one or more characters; and determining facial emotions associated with each of the one or more characters in one or more settings in each of the one or more media items.

Example 18 includes the subject matter of Example 10 or 15, further comprising: extracting goals and sequence of elements of the story; facilitating editing of contents of the story; and associating one or more hashtags to the story.

Some embodiments pertain to Example 19 includes a system comprising a storage device having instructions, and a processor to execute the instructions to facilitate a mechanism to: receive, via one or more capturing/sensing components at a computing device, one or more media items relating to an event; capture a theme from the one or more media items, wherein the theme is captured based on at least one of activities, textual content, and scenes associated with the event; and form a plurality of story elements to generate a story relating to the event, wherein the plurality of story elements are formed based on at least one of one or more characters, the theme associated with the event, and one or more emotions associated with the one or more characters, wherein the story is presented, via one or more display devices, to one or more users having access to the one or more display devices.

Example 20 includes the subject matter of Example 19, wherein the mechanism is further to: extract the one or more characters from the one or more media items, wherein the one or more characters having assigned one or more roles representing one or more individuals associated with the event; determine the one or more emotions from the one or more media items, wherein the one or more emotions are determined based on one or more expressions associated with the one or more characters; and generate the story based on the plurality of story elements, wherein the story is posted at one or more websites.

Example 21 includes the subject matter of Example 19 or 20, wherein the story is posted as at least one of a social posting at a social networking website, a blog posting at a news or blogging website, and a template posting having one or more story templates posted at a philanthropic website or a commercial website.

Example 22 includes the subject matter of Example 21, wherein the one or more story templates are downloadable by the one or more users to auto-generate stories using the one or more story templates having the plurality of elements associated with the story.

Example 23 includes the subject matter of Example 19, wherein the mechanism is further to monitor the one or more media items being received from one or more media sources over a communication medium, wherein the one or more media sources include at least one of a website, a media feed, a media player, a computing device, a sensor array, a camera, and a microphone, wherein the one or more media items include at least one of pictures, videos, audios, live chatter, text messages, postings, comments, feedbacks, and blogs.

Example 24 includes the subject matter of Example 19, wherein the mechanism is further to: extract, from the one or more media items, one or more identities or the one or more roles associated with the one or more characters wherein the one or more identities are extracted based on at least one of comments or descriptions associated with the one or more characters such that an identity associated with a character is detected based on at least one of a role, a comment, and a description associated with the character, wherein the identity refers to one or more of a parent, a child, a relative, a friend, a neighbor, a teammate, a coach, a boss, an employee, and a stranger; resolve one or more references relating to the one or more characters, wherein the one or more references include one or more pronouns associated with the one or more characters; discover one or more locations of the event, wherein the one or more locations are discovered based on global positioning system (GPS) coordinates relating to one or more computing devices accessible to the one or more characters; and determine the one or more roles associated with the one or more characters, wherein a role is assigned to a character of the one or more characters based on a comment regarding the character, wherein the one or more roles further refer to one or more relationships between two or more characters, wherein the one or more relationships include one or more of parent-child, brother-sister, aunt-nephew, grandfather-grandson, teammate-teammate, coach-player, neighbor-neighbor, boss-subordinate, owner-employee, partner-partner, and stranger-stranger.

Example 25 includes the subject matter of Example 19 or 24, wherein the mechanism is further to: extracting location-related information relating to the one or more locations discovered based on the GPS coordinates, wherein the location-related information includes at least one of a local scene, a local culture, a local climate, a local language, a local time, and a local history, wherein the location-related information includes indigenous events or global events being performed locally such that the local scene includes a farmer's market, a garage sale, a beer festival, a new year's day celebration, a soccer world cup, and a royal coronation, wherein the theme is formed based on the location-related information; extract time-related information relating to the one or more locations; statistically analyze words obtained from each of the one or more media items, wherein the theme is confirmed based on the statistically analyzed words; and analyze visible items in the one or more media items, wherein the visible items include at least one of objects, clothing, other individuals, animals, vegetation, weather, foregrounds, and backgrounds in each of the media items, wherein the backgrounds include one or more of color schemes, weather patterns, wall shades, and moods in imagery based on general scenery or photographic techniques, wherein the visible items are analyzed to determine a scene from the theme, wherein analyzing further includes analyzing metadata associated with the visible items or the one or more characters in the one or more media items, the metadata being captured in real-time indicates relevant information about each of the visible items, the one or more characters, and the one or more roles or the one or more identities associated with the one or more characters.

Example 26 includes the subject matter of Example 19 or 24, wherein the mechanism is further to: determine sentiments associated with each of the one or more characters and in each of the one or more media items, wherein the sentiments are determined based on semantic analysis of the metadata relating to one or more characters, wherein semantic analysis include psycho-linguistic analysis of the one or more characters; and determine facial emotions associated with each of the one or more characters in one or more settings in each of the one or more media items.

Example 27 includes the subject matter of Example 19 or 24, wherein the mechanism is further to: extract goals and sequence of elements of the story; facilitate editing of contents of the story; and associate one or more hashtags to the story.

Some embodiments pertain to Example 28 includes an apparatus comprising: means for receiving, by one or more capturing/sensing components at a computing device, one or more media items relating to an event; means for capturing a theme from the one or more media items, wherein the theme is captured based on at least one of activities, textual content, and scenes associated with the event; and means for forming a plurality of story elements to generate a story relating to the event, wherein the plurality of story elements are formed based on at least one of one or more characters, the theme associated with the event, and one or more emotions associated with the one or more characters, wherein the story is presented, via one or more display devices, to one or more users having access to the one or more display devices.

Example 29 includes the subject matter of Example 28, further comprising: means for extracting the one or more characters from the one or more media items, wherein the one or more characters having assigned one or more roles representing one or more individuals associated with the event; means for determining the one or more emotions from the one or more media items, wherein the one or more emotions are determined based on one or more expressions associated with the one or more characters; and means for generating the story based on the plurality of story elements, wherein the story is posted at one or more websites.

Example 30 includes the subject matter of Example 28 or 29, wherein the story is posted as at least one of a social posting at a social networking website, a blog posting at a news or blogging website, and a template posting having one or more story templates posted at a philanthropic website or a commercial website.

Example 31 includes the subject matter of Example 28, wherein the one or more story templates are downloadable by the one or more users to auto-generate stories using the one or more story templates having the plurality of elements associated with the story.

Example 32 includes the subject matter of Example 28, further comprising means for monitoring the one or more media items being received from one or more media sources over a communication medium, wherein the one or more media sources include at least one of a website, a media feed, a media player, a computing device, a sensor array, a camera, and a microphone, wherein the one or more media items include at least one of pictures, videos, audios, live chatter, text messages, postings, comments, feedbacks, and blogs.

Example 33 includes the subject matter of Example 28, further comprising: means for extracting, from the one or more media items, one or more identities or the one or more roles associated with the one or more characters wherein the one or more identities are extracted based on at least one of comments or descriptions associated with the one or more characters such that an identity associated with a character is detected based on at least one of a role, a comment, and a description associated with the character, wherein the identity refers to one or more of a parent, a child, a relative, a friend, a neighbor, a teammate, a coach, a boss, an employee, and a stranger; resolving one or more references relating to the one or more characters, wherein the one or more references include one or more pronouns associated with the one or more characters; means for discovering one or more locations of the event, wherein the one or more locations are discovered based on global positioning system (GPS) coordinates relating to one or more computing devices accessible to the one or more characters; and means for determining the one or more roles associated with the one or more characters, wherein a role is assigned to a character of the one or more characters based on a comment regarding the character, wherein the one or more roles further refer to one or more relationships between two or more characters, wherein the one or more relationships include one or more of parent-child, brother-sister, aunt-nephew, grandfather-grandson, teammate-teammate, coach-player, neighbor-neighbor, boss-subordinate, owner-employee, partner-partner, and stranger-stranger.

Example 34 includes the subject matter of Example 28 or 33, further comprising: means for extracting location-related information relating to the one or more locations discovered based on the GPS coordinates, wherein the location-related information includes at least one of a local scene, a local culture, a local climate, a local language, a local time, and a local history, wherein the location-related information includes indigenous events or global events being performed locally such that the local scene includes a farmer's market, a garage sale, a beer festival, a new year's day celebration, a soccer world cup, and a royal coronation, wherein the theme is formed based on the location-related information; means for extracting time-related information relating to the one or more locations; means for statistically analyzing words obtained from each of the one or more media items, wherein the theme is confirmed based on the statistically analyzed words; and means for analyzing visible items in the one or more media items, wherein the visible items include at least one of objects, clothing, other individuals, animals, vegetation, weather, foregrounds, and backgrounds in each of the media items, wherein the backgrounds include one or more of color schemes, weather patterns, wall shades, and moods in imagery based on general scenery or photographic techniques, wherein the visible items are analyzed to determine a scene from the theme, wherein analyzing further includes analyzing metadata associated with the visible items or the one or more characters in the one or more media items, the metadata being captured in real-time indicates relevant information about each of the visible items, the one or more characters, and the one or more roles or the one or more identities associated with the one or more characters.

Example 35 includes the subject matter of Example 28 or 33, further comprising: means for determining sentiments associated with each of the one or more characters and in each of the one or more media items, wherein the sentiments are determined based on semantic analysis of the metadata relating to one or more characters, wherein semantic analysis include psycho-linguistic analysis of the one or more characters; and means for determining facial emotions associated with each of the one or more characters in one or more settings in each of the one or more media items.

Example 36 includes the subject matter of Example 28 or 33, further comprising: means for extracting goals and sequence of elements of the story; means for facilitating editing of contents of the story; and means for associating one or more hashtags to the story.

Example 37 includes at least one non-transitory machine-readable medium comprising a plurality of instructions, when executed on a computing device, to implement or perform a method as claimed in any of claims or examples 10-18.

Example 38 includes at least one machine-readable medium comprising a plurality of instructions, when executed on a computing device, to implement or perform a method as claimed in any of claims or examples 10-18.

Example 39 includes a system comprising a mechanism to implement or perform a method as claimed in any of claims or examples 10-18.

Example 40 includes an apparatus comprising means for performing a method as claimed in any of claims or examples 10-18.

Example 41 includes a computing device arranged to implement or perform a method as claimed in any of claims or examples 10-18.

Example 42 includes a communications device arranged to implement or perform a method as claimed in any of claims or examples 10-18.

Example 43 includes at least one machine-readable medium comprising a plurality of instructions, when executed on a computing device, to implement or perform a method or realize an apparatus as claimed in any preceding claims or examples.

Example 44 includes at least one non-transitory machine-readable medium comprising a plurality of instructions, when executed on a computing device, to implement or perform a method or realize an apparatus as claimed in any preceding claims or examples.

Example 45 includes a system comprising a mechanism to implement or perform a method or realize an apparatus as claimed in any preceding claims or examples.

Example 46 includes an apparatus comprising means to perform a method as claimed in any preceding claims or examples.

Example 47 includes a computing device arranged to implement or perform a method or realize an apparatus as claimed in any preceding claims or examples.

Example 48 includes a communications device arranged to implement or perform a method or realize an apparatus as claimed in any preceding claims or examples.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
   detection/reception logic to receive one or more media items relating to an event;
   event extraction engine to capture a theme from the one or more media items, wherein the theme is captured based on at least one of activities, textual content, and scenes associated with the event;
   story and scene segmentation engine to form a plurality of story elements to generate a story relating to the event, wherein the plurality of story elements are formed based on at least one of one or more characters, the theme associated with the event, and one or more emotions associated with the one or more characters, wherein the story is presented, via one or more display devices, to one or more users having access to the one or more display devices;
   character resolution engine to extract the one or more characters from the one or more media items, wherein the one or more characters having assigned one or more roles representing one or more individuals associated with the event;
   emotion understanding engine to determine the one or more emotions from the one or more media items, wherein the one or more emotions are determined based on one or more expressions associated with the one or more characters;
   feedback and generation/presentation logic to generate the story based on the plurality of story elements, wherein the feedback and generation/presentation logic is further to facilitate posting of the story at one or more websites;
   named entity resolution logic to extract, from the one or more media items, one or more identities or the one or more roles associated with the one or more characters wherein the one or more identities are extracted based on at least one of comments or descriptions associated with the one or more characters such that an identity associated with a character is detected based on at least one of a role, a comment, and a description associated with the character, wherein the identity refers to one or more of a parent, a child, a relative, a friend, a neighbor, a teammate, a coach, a boss, an employee, and a stranger;
   co-reference resolution logic to resolve one or more references relating to the one or more characters, wherein the one or more references include one or more pronouns associated with the one or more characters;
   contextual discovery logic to discover one or more locations of the event, wherein the one or more locations are discovered based on global positioning system (GPS) coordinates relating to one or more computing devices accessible to the one or more characters; and
   role assignment logic to determine the one or more roles associated with the one or more characters, wherein the role assignment logic is further to assign a role to a character of the one or more characters based on a comment regarding the character, wherein the one or more roles further refer to one or more relationships between two or more characters, wherein the one or more relationships include one or more of parent-child, brother-sister, aunt-nephew, grandfather-grandson, teammate-teammate, coach-player, neighbor-neighbor, boss-subordinate, owner-employee, partner-partner, and stranger-stranger.

2. The apparatus of claim 1, wherein the story is posted as at least one of a social posting at a social networking website, a blog posting at a news or blogging website, and a template posting having one or more story templates posted at a philanthropic website or a commercial website.

3. The apparatus of claim 2, wherein the one or more story templates are downloadable by the one or more users to auto-generate stories using the one or more story templates having the plurality of elements associated with the story.

4. The apparatus of claim 1, further comprising monitoring logic to monitor the one or more media items being received from one or more media sources over a communication medium, wherein the one or more media sources include at least one of a website, a media feed, a media player, a computing device, a sensor array, a camera, and a microphone, wherein the one or more media items include at least one of pictures, videos, audios, live chatter, text messages, postings, comments, feedbacks, and blogs.

5. The apparatus of claim 1, wherein the event extraction engine further comprises:
   location resolution logic to extract location-related information relating to the one or more locations discovered based on the GPS coordinates, wherein the location-related information includes at least one of a local scene, a local culture, a local climate, a local language, a local time, and a local history, wherein the location-related information includes indigenous events or global events being performed locally such that the local scene includes a farmer's market, a garage sale, a beer festival, a new year's day celebration, a soccer world cup, and a royal coronation, wherein the theme is formed based on the location-related information;
   temporal resolution logic to extract time-related information relating to the one or more locations;
   topic modeling logic to statistically analyze words obtained from each of the one or more media items, wherein the theme is confirmed based on the statistically analyzed words; and
   scene understanding logic to analyze visible items in the one or more media items, wherein the visible items include at least one of objects, clothing, other individuals, animals, vegetation, weather, foregrounds, and backgrounds in each of the media items, wherein the backgrounds include one or more of color schemes, weather patterns, wall shades, and moods in imagery based on general scenery or photographic techniques, wherein the visible items are analyzed to determine a scene from the theme,
   wherein the scene understanding logic is further to analyze metadata associated with the visible items or the one or more characters in the one or more media items, the metadata being captured in real-time indicates relevant information about each of the visible items, the one or more characters, and the one or more roles or the one or more identities associated with the one or more characters.

6. The apparatus of claim 1, wherein the emotion understanding engine further comprises:
   sentiment analysis logic to determine sentiments associated with each of the one or more characters and in each of the one or more media items, wherein the sentiments are determined based on semantic analysis of the metadata relating to one or more characters, wherein semantic analysis include psycho-linguistic analysis of the one or more characters; and
   facial emotion analysis logic to determine facial emotions associated with each of the one or more characters in one or more settings in each of the one or more media items.

7. The apparatus of claim 1, wherein the story segmentation engine further comprises:
   goal identification logic to extract goals and sequence of elements of the story;
   interactive editor to facilitate editing of contents of the story; and
   hashtag generator to associate one or more hashtags to the story.

8. A method comprising:
   receiving, by one or more capturing/sensing components at a computing device, one or more media items relating to an event;
   capturing a theme from the one or more media items, wherein the theme is captured based on at least one of activities, textual content, and scenes associated with the event;
   forming a plurality of story elements to generate a story relating to the event, wherein the plurality of story elements are formed based on at least one of one or more characters, the theme associated with the event, and one or more emotions associated with the one or more characters, wherein the story is presented, via one or more display devices, to one or more users having access to the one or more display devices;
   extracting the one or more characters from the one or more media items, wherein the one or more characters having assigned one or more roles representing one or more individuals associated with the event;
   determining the one or more emotions from the one or more media items, wherein the one or more emotions are determined based on one or more expressions associated with the one or more characters;
   generating the story based on the plurality of story elements, wherein the story is posted at one or more websites;
   extracting, from the one or more media items, one or more identities or the one or more roles associated with the one or more characters wherein the one or more identities are extracted based on at least one of comments or descriptions associated with the one or more characters such that an identity associated with a character is detected based on at least one of a role, a comment, and a description associated with the character, wherein the identity refers to one or more of a parent, a child, a relative, a friend, a neighbor, a teammate, a coach, a boss, an employee, and a stranger;
   resolving one or more references relating to the one or more characters, wherein the one or more references include one or more pronouns associated with the one or more characters;
   discovering one or more locations of the event, wherein the one or more locations are discovered based on global positioning system (GPS) coordinates relating to one or more computing devices accessible to the one or more characters; and
   determining the one or more roles associated with the one or more characters, wherein a role is assigned to a character of the one or more characters based on a comment regarding the character, wherein the one or more roles further refer to one or more relationships between two or more characters, wherein the one or more relationships include one or more of parent-child, brother-sister, aunt-nephew, grandfather-grandson, teammate-teammate, coach-player, neighbor-neighbor, boss-subordinate, owner-employee, partner-partner, and stranger-stranger.

9. The method of claim 8, wherein the story is posted as at least one of a social posting at a social networking website, a blog posting at a news or blogging website, and a template posting having one or more story templates posted at a philanthropic website or a commercial website.

10. The method of claim 9, wherein the one or more story templates are downloadable by the one or more users to auto-generate stories using the one or more story templates having the plurality of elements associated with the story.

11. The method of claim 8, further comprising monitoring the one or more media items being received from one or more media sources over a communication medium, wherein the one or more media sources include at least one of a website, a media feed, a media player, a computing device, a sensor array, a camera, and a microphone, wherein the one or more media items include at least one of pictures, videos, audios, live chatter, text messages, postings, comments, feedbacks, and blogs.

12. The method of claim 8, further comprising:
extracting location-related information relating to the one or more locations discovered based on the GPS coordinates, wherein the location-related information includes at least one of a local scene, a local culture, a local climate, a local language, a local time, and a local history, wherein the location-related information includes indigenous events or global events being performed locally such that the local scene includes a farmer's market, a garage sale, a beer festival, a new year's day celebration, a soccer world cup, and a royal coronation, wherein the theme is formed based on the location-related information;
extracting time-related information relating to the one or more locations;
statistically analyzing words obtained from each of the one or more media items, wherein the theme is confirmed based on the statistically analyzed words; and
analyzing visible items in the one or more media items, wherein the visible items include at least one of objects, clothing, other individuals, animals, vegetation, weather, foregrounds, and backgrounds in each of the media items, wherein the backgrounds include one or more of color schemes, weather patterns, wall shades, and moods in imagery based on general scenery or photographic techniques, wherein the visible items are analyzed to determine a scene from the theme,
wherein analyzing further includes analyzing metadata associated with the visible items or the one or more characters in the one or more media items, the metadata being captured in real-time indicates relevant information about each of the visible items, the one or more characters, and the one or more roles or the one or more identities associated with the one or more characters.

13. The method of claim 8, further comprising:
determining sentiments associated with each of the one or more characters and in each of the one or more media items, wherein the sentiments are determined based on semantic analysis of the metadata relating to one or more characters, wherein semantic analysis include psycho-linguistic analysis of the one or more characters; and
determining facial emotions associated with each of the one or more characters in one or more settings in each of the one or more media items.

14. The method of claim 8, further comprising:
extracting goals and sequence of elements of the story;
facilitating editing of contents of the story; and
associating one or more hashtags to the story.

15. At least one non-transitory machine-readable medium comprising a plurality of instructions, executed on a computing device, to facilitate the computing device to:
receive, via one or more capturing/sensing components at a computing device, one or more media items relating to an event;
capture a theme from the one or more media items, wherein the theme is captured based on at least one of activities, textual content, and scenes associated with the event; and
form a plurality of story elements to generate a story relating to the event, wherein the plurality of story elements are formed based on at least one of one or more characters, the theme associated with the event, and one or more emotions associated with the one or more characters, wherein the story is presented, via one or more display devices, to one or more users having access to the one or more display devices;
extract the one or more characters from the one or more media items, wherein the one or more characters having assigned one or more roles representing one or more individuals associated with the event;
determine the one or more emotions from the one or more media items, wherein the one or more emotions are determined based on one or more expressions associated with the one or more characters;
generate the story based on the plurality of story elements, wherein the story is posted at one or more websites, wherein the story is posted as at least one of a social posting at a social networking website, a blog posting at a news or blogging website, and a template posting having one or more story templates posted at a philanthropic website or a commercial website, wherein the one or more story templates are downloadable by the one or more users to auto-generate stories using the one or more story templates having the plurality of elements associated with the story;
monitor the one or more media items being received from one or more media sources over a communication medium, wherein the one or more media sources include at least one of a website, a media feed, a media player, a computing device, a sensor array, a camera, and a microphone, wherein the one or more media items include at least one of pictures, videos, audios, live chatter, text messages, postings, comments, feedbacks, and blogs;
extract, from the one or more media items, one or more identities or the one or more roles associated with the one or more characters wherein the one or more identities are extracted based on at least one of comments or descriptions associated with the one or more characters such that an identity associated with a character is detected based on at least one of a role, a comment, and a description associated with the character, wherein the identity refers to one or more of a parent, a child, a relative, a friend, a neighbor, a teammate, a coach, a boss, an employee, and a stranger;

resolve one or more references relating to the one or more characters, wherein the one or more references include one or more pronouns associated with the one or more characters;

discover one or more locations of the event, wherein the one or more locations are discovered based on global positioning system (GPS) coordinates relating to one or more computing devices accessible to the one or more characters; and determine the one or more roles associated with the one or more characters, wherein a role is assigned to a character of the one or more characters based on a comment regarding the character, wherein the one or more roles further refer to one or more relationships between two or more characters, wherein the one or more relationships include one or more of parent-child, brother-sister, aunt-nephew, grandfather-grandson, teammate-teammate, coach-player, neighbor-neighbor, boss-subordinate, owner-employee, partner-partner, and stranger-stranger.

16. The non-transitory machine-readable medium of claim 15, wherein the computing device is further to:

extract location-related information relating to the one or more locations discovered based on the GPS coordinates, wherein the location-related information includes at least one of a local scene, a local culture, a local climate, a local language, a local time, and a local history, wherein the location-related information includes indigenous events or global events being performed locally such that the local scene includes a farmer's market, a garage sale, a beer festival, a new year's day celebration, a soccer world cup, and a royal coronation, wherein the theme is formed based on the location-related information;

extract time-related information relating to the one or more locations;

statistically analyze words obtained from each of the one or more media items, wherein the theme is confirmed based on the statistically analyzed words; and analyze visible items in the one or more media items, wherein the visible items include at least one of objects, clothing, other individuals, animals, vegetation, weather, foregrounds, and backgrounds in each of the media items, wherein the backgrounds include one or more of color schemes, weather patterns, wall shades, and moods in imagery based on general scenery or photographic techniques, wherein the visible items are analyzed to determine a scene from the theme, wherein analyzing further includes analyzing metadata associated with the visible items or the one or more characters in the one or more media items, the metadata being captured in real-time indicates relevant information about each of the visible items, the one or more characters, and the one or more roles or the one or more identities associated with the one or more characters.

17. The non-transitory machine-readable medium of claim 15, wherein the computing device is further to:

determine sentiments associated with each of the one or more characters and in each of the one or more media items, wherein the sentiments are determined based on semantic analysis of the metadata relating to one or more characters, wherein semantic analysis include psycho-linguistic analysis of the one or more characters; and determine facial emotions associated with each of the one or more characters in one or more settings in each of the one or more media items.

18. The non-transitory machine-readable medium of claim 15, wherein the computing device is further to:

extract goals and sequence of elements of the story;

facilitate editing of contents of the story; and associate one or more hashtags to the story.

* * * * *